US010801940B2

(12) United States Patent
Nourbakhsh et al.

(10) Patent No.: US 10,801,940 B2
(45) Date of Patent: Oct. 13, 2020

(54) LOW ENERGY ULTRAFINE PARTICLE DETECTOR

(71) Applicant: Airviz Inc., Pittsburgh, PA (US)

(72) Inventors: Illah Nourbakhsh, Pittsburgh, PA (US); Michael Taylor, Pittsburgh, PA (US); David Litton, Pittsburgh, PA (US); Joshua Schapiro, Pittsburgh, PA (US)

(73) Assignee: AIRVIZ INC., Pittsburgh, PA (US)

( * ) Notice: Subject to any disclaimer, the term of this patent is extended or adjusted under 35 U.S.C. 154(b) by 0 days.

(21) Appl. No.: 16/497,701

(22) PCT Filed: Jun. 1, 2018

(86) PCT No.: PCT/US2018/035582
§ 371 (c)(1),
(2) Date: Sep. 25, 2019

(87) PCT Pub. No.: WO2018/222980
PCT Pub. Date: Dec. 6, 2018

(65) Prior Publication Data
US 2020/0271560 A1    Aug. 27, 2020

Related U.S. Application Data

(60) Provisional application No. 62/514,301, filed on Jun. 2, 2017.

(51) Int. Cl.
*G01N 15/02*       (2006.01)
*G01N 15/06*       (2006.01)
(Continued)

(52) U.S. Cl.
CPC ......... *G01N 15/0205* (2013.01); *G01N 15/06* (2013.01); *G01N 15/1429* (2013.01);
(Continued)

(58) Field of Classification Search
CPC .............. G01N 15/02; G01N 15/0205; G01N 15/0211; G01N 15/0227; G01N 15/0255;
(Continued)

(56) References Cited

U.S. PATENT DOCUMENTS 6,055,052 A * 4/2000 Lilienfeld .............. G01N 15/02
250/574
6,674,529 B2 * 1/2004 Sachweh ............ G01N 15/0211
356/338

(Continued)

FOREIGN PATENT DOCUMENTS

WO    WO 2017/174978 A1    10/2017

OTHER PUBLICATIONS

International Search Report and Written Opinion of the International Searching Authority for International Application No. PCT/US2018/035582 dated Aug. 23, 2018.

*Primary Examiner* — Gordon J Stock, Jr.
(74) *Attorney, Agent, or Firm* — K&L Gates LLP

(57) ABSTRACT

A low energy particle detection device comprises alight source, multiple photodetectors positioned at different scattering angles, and a microcontroller for computing a total mass concentration of fine and ultrafine particles and a mass fraction of ultrafine particles to fine particles in an incoming air particle airflow based on the ratio of the readings from the multiple photodetectors. The optical particle detection device also can determine surface area concentration of the air particle sample and the associated lung deposited surface area (LDSA) to measure and improve estimates of air quality.

20 Claims, 17 Drawing Sheets

(51) Int. Cl.
*G01N 15/14* (2006.01)
*G01N 21/53* (2006.01)
*G01N 21/47* (2006.01)

(52) U.S. Cl.
CPC ..... *G01N 21/53* (2013.01); *G01N 2015/0693* (2013.01); *G01N 2021/4704* (2013.01)

(58) Field of Classification Search
CPC .............. G01N 15/0272; G01N 15/06; G01N 15/0606; G01N 15/0612; G01N 15/0618; G01N 15/0625; G01N 15/1436; G01N 15/1434; G01N 15/1404; G01N 2015/0046; G01N 2015/0096; G01N 2015/0216; G01N 2015/0222; G01N 2015/0233; G01N 2015/0238; G01N 2015/0261; G01N 2015/0277; G01N 2015/0283; G01N 2015/0288; G01N 2015/0294; G01N 2015/03; G01N 2015/035; G01N 2015/0681; G01N 2015/0693; G01N 21/47; G01N 21/49; G01N 21/53; G01N 21/532; G01N 21/534; G01N 2021/4702; G01N 2021/4704; G01N 2021/4707; G01N 2021/4709; G01N 2021/4711; G01N 2021/4714; G01N 2021/4716; G01N 2021/4723; G01N 2021/4726; G01N 2021/4728; G08B 17/10; G08B 17/103; G08B 17/107

USPC ......... 250/573–577; 356/335–343; 73/865.5, 73/28.01–28.06, 24.03, 31.01–31.03

See application file for complete search history.

(56) References Cited

U.S. PATENT DOCUMENTS

| | | | |
|---|---|---|---|
| 6,965,240 B1* | 11/2005 | Litton | G01N 15/0656 324/448 |
| 7,111,496 B1* | 9/2006 | Lilienfeld | G01N 21/51 356/338 |
| 7,782,459 B2* | 8/2010 | Holve | G01N 15/0205 356/336 |
| 7,932,490 B2 | 4/2011 | Wang et al. | |
| 8,351,035 B2* | 1/2013 | Goohs | G01N 21/53 356/337 |
| 10,006,858 B2* | 6/2018 | Hart | G01N 15/1459 |
| 10,359,350 B1* | 7/2019 | Lin | G01N 15/1434 |
| 2011/0187850 A1 | 8/2011 | Barnes | |
| 2014/0268144 A1* | 9/2014 | Pariseau | G01N 15/1459 356/343 |
| 2014/0309782 A1 | 10/2014 | Sharpe et al. | |
| 2016/0305872 A1 | 10/2016 | Kaye et al. | |
| 2018/0149577 A1* | 5/2018 | Wang | G01N 33/0027 |

\* cited by examiner

LOW ENERGY ULTRAFINE PARTICLE DETECTOR

PRIORITY CLAIM

The present application claims priority to U.S. provisional application Ser. No. 62/514,301, filed Jun. 2, 2017, having the same title and inventors as the present application, and which is incorporated herein by reference in its entirety.

BACKGROUND

Significant bodies of research indicate that cumulative, personal exposure to fine particulates and ultrafine particulates are strongly correlated with pulmonary disease and cardiovascular disease, for instance as reported extensively by U.S. Pat. No. 8,147,302. In addition, statistically significant correlations have now been discovered between exposure to particles with diameters less than 2.5 µm ($PM_{2.5}$) by pregnant women and the onset of autism and attention deficit hyperactivity disorder in children born to exposed pregnant women. Daily exposure in the residential home and while carrying mobile devices represents a large portion of a person's overall exposure profile to air pollution. Therefore, direct measurement and reporting of home air pollution and mobile exposure can provide valuable insight. Such insight may be used for mitigation of overall pollution exposure in order to maximize long-term and short-term health.

Optical scattering techniques are used widely to detect and monitor suspended particulate matter for particles with diameters less than $PM_{2.5}$. Scattering techniques include techniques based on obscuration of a well-defined laser beam such that the number of particles can be counted and the sizes of particles can be estimated. Another technique is based on the intensity of monochromatic electromagnetic radiation (EM) scattered at some well-defined angle from a volume irradiated using a light emitting diode (LED) or another suitable light source, such as a small diode laser. This technique can be used quite extensively in simple and inexpensive light scattering modules. Such modules may be incorporated into portable units containing additional software and electronics for data collection, display, and storage. One such portable unit is a basic sensor that utilizes a LED at a wavelength of around 850 nanometers (nm) as the light source and an inexpensive silicon photodetector to measure the scattered light at a typical forward scattering angle of 60°.

Such devices may be reasonably sensitive to particles with diameters greater than or equal to 350 nm. But as particle diameters decrease, the sensitivity of these devices begins to decrease. While elevated levels of $PM_{2.5}$ are clearly recognized as unhealthy, recent data (e.g. from Low-Concentration $PM_{2.5}$ and Mortality: Estimating Acute and Chronic Effects in a Population-Based Study Shi L1, Zanobetti A, Kloog I, Coull B A, Koutrakis P, Melly S J, Schwartz J D. Environ Health Perspect. 2016 January; 124(1):46-52. doi: 10.1289/ehp.1409111. Epub 2015 Jun. 3) suggests that adverse health outcomes and premature morbidity still occur at particles with diameters less than $PM_{2.5}$ levels that are well below globally accepted levels typically characterized as "good." These adverse effects are most likely due to $PM_{2.5}$ levels comprising high numbers of ultrafine particles that are present in the air but contribute negligibly to $PM_{2.5}$ mass concentrations. The negligible contributions may be due to an increasing surface to volume ratio. In addition, particles with diameters less than about 200 nm are deposited deep in the alveolar regions of the lungs with high efficiencies. At the alveolar regions, particle surfaces can react with the surrounding tissue.

SUMMARY

In one general aspect, the present invention is directed to an optical particle detection system for detecting fine and ultrafine particulates. The system may comprise an optical particle detection device configured to execute algorithms to effect a low-power particle detection strategy. The optical particle-detection device may comprise a wireless transceiver device for communication abilities such as via Bluetooth Low Energy (BLE). The optical particle detection system can be configured to provide specific feedback and information to users. Physical design considerations enable detection of both fine and ultrafine particulates in a small form factor, e.g. less than two inches in size. Active energy management and wireless, cached communications management enables efficient offboarding of air quality information. Wireless pairing processes enable matching air quality devices to mobile consumer products, together with the storage of critical contextual information required for accurate recommendations and visualization. Techniques for estimating life and signal quality of Volatile Organic Compound (VOC) chips enable addition of VOC pollution measurements to underlying particulate measurements.

In another general aspect, the present invention is directed to an air particle detection device and a method for detecting a mass fraction of ultrafine air particles in an air particle flow. In one embodiment, the air particle detection device comprises a housing defining a detection zone such that an air particle flow flows through the detection zone. The housing comprises an electromagnetic radiation source (e.g., a light source, such as a laser) that emits electromagnetic radiation along an electromagnetic radiation path toward the detection zone, such that the air particle flow scatters electromagnetic radiation from the electromagnetic radiation source. The housing further comprises first and second electromagnetic radiation sensors (e.g., photodetectors) that are each positioned at a different scattering angle relative to the electromagnetic radiation path, such that each of the first and second electromagnetic radiation sensors produces a scattering intensity output signal indicative of an intensity of the electromagnetic radiation scattered at the corresponding scattering angle of the corresponding electromagnetic radiation sensor by the air particle flow. The air particle detection device further comprises a processor communicatively coupled to the first and second electromagnetic radiation sensor. The processor is configured to receive the scattering intensity output signals from the first and second electromagnetic radiation sensors and to calculate a mass fraction of ultrafine air particles in the air particle flow based in part on a ratio of the scattering intensity output signals from the first and second electromagnetic radiation sensor.

These and other benefits of the present invention are apparent from the description herein.

FIGURES

Various embodiments of the present invention are described herein by way of example in connection with the following figures, wherein.

DESCRIPTION

Figure 1:
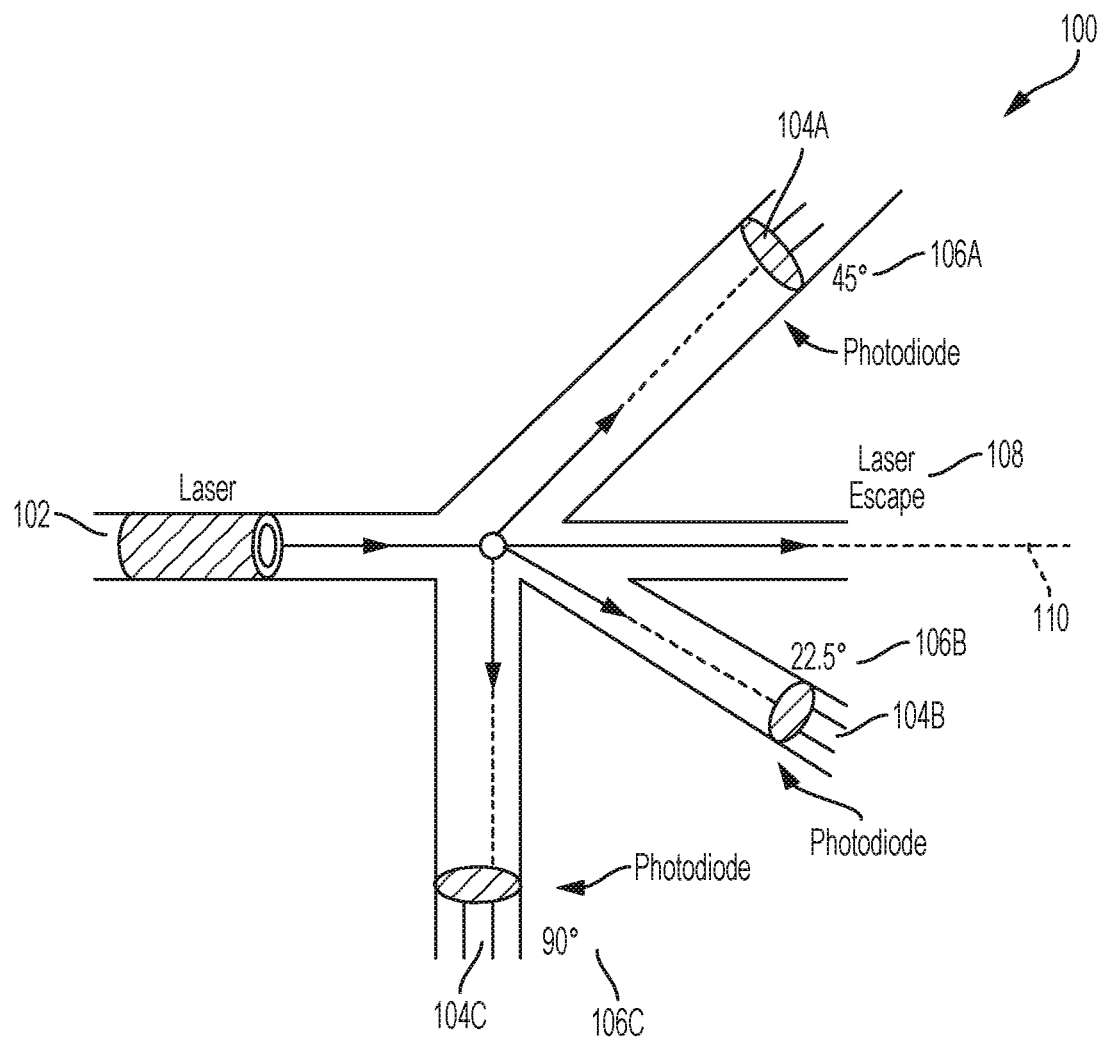
FIG. 1 is an illustration of an embodiment of the physical device geometry of an optical particle detection device for detecting both fine and ultrafine particulates using scattered light behavior according to various embodiments of the present invention.

FIG. 1 is an illustration of an embodiment of the physical device geometry of an optical particle detection device for detecting both fine and ultrafine particulates using scattered light behavior according to various embodiments of the present invention. In particular, FIG. 1 illustrates aspects of a sensor device 100 to implement a technique for assessing the concentrations of fine and ultrafine particles that exist either separately or as some component of measured $PM_{2.5}$, according to various embodiments of the present invention. The sensor device 100 may be an optical particle detection device, and is sometimes referred to hereinafter as "optical particle detection device 100." Unlike conventional particle detection devices, the optical particle detection device 100 may be a low power device for detecting fine and ultrafine particles. The optical particle detection device 100 comprises a light source 102, a number of photodetectors 104A-C disposed at predetermined and different scattering angles for creating corresponding scattering paths 106A-C, and a laser escape 108. The light source 102 can be any suitable small, collimated light source such as an LED or diode laser that produces monochromatic EM radiation. Light emitted from the light source 102 is radiated along a radiation path 110 and can intersect an air particle flow that flows perpendicular to the radiation path 110 (e.g., in to/out of the drawing sheet). This air particle flow may comprise a flow of air particles, such as fine and ultrafine particles.

In one embodiment, the photodetectors 104A-C are positioned at three different angles relative to the lateral axis 110, such as 45°, 22.5°, and 90°. In another embodiment, the photodetectors 104A-C are positioned at angles 15°, 45°, and 75°. However, any suitable predetermined scattering angles may be used. Furthermore, fewer or more than three photodetectors could also be used, as appropriate. The photodetectors 104A-C may receive different amounts of scattered light depending, for example, on particle size and particle concentration of the particles in the incoming airflow to the sensor. One of the photodetectors 104A may be placed at a small forward angle relative to the lateral axis 110 to avoid receiving or sensing undesired features (i.e. noise rather than scattered light). The small forward angle may be between 10° to 30° degrees (e.g., 22.5 degrees), for example. The photodetectors 104A-C output voltage signals that are responsive to exposure of light from the light source 102. These voltage signals can be referred to as scattering intensity output signals that are respectively indicative of the intensity of the light scattered at the corresponding angles of the photodetectors 104A-C, which are 45°, 22.5°, and 90° in FIG. 1.

The photodetectors 104A-C may also be implemented, for example, with photodiodes or phototransistors or any suitable photodetector for converting photons to electrical current. The laser escape 108 may be a light trap or any suitable exit path for the photons emitted from the light source 102 that travel along the axis 110. The wavelength of light emitted by a light source 102 may be 520 nm, 650 nm, 780 nm, 880 nm or any suitable wavelength. In another embodiment, the optical particle detection device 100 may comprise multiple (e.g., 2) light sources 102 that may emit light in different wavelengths to obtain additional angular intensity and/or output voltage signal ratios to compute ultrafine mass fraction, $f_u$, as described in further detail below.

The optical particle detection device 100 may be used for assessing the concentrations of fine and ultrafine particles that exist either separately or as some component of measured $PM_{2.5}$. In various exemplary embodiments, a particle size categorization may be defined in the following manner: coarse particles are particles with diameters greater than 2.5 μm; fine and not ultrafine ("FANU") particles are particles with diameters between 0.30 μm and diameters of 2.5 μm ($PM_{0.1}$); and ultrafine particles are particles with diameters less than 0.30 μm. In other embodiments, other particle size categorizations can be used. In one embodiment, the assessment technique comprises measuring angular scattering intensities at two or more forward scattering angles (i.e. the scattering paths 106) of light emitted by the light source 102, and calculating a ratio of the intensities for the angles used. The ratio(s) provides a convenient marker for assessing if there are ultrafine particles present in the air being sampled based on determining the ultrafine mass fraction. In other words, the ratio and signal values generated by the optical particle detection device 100 can enable estimations of both magnitude of pollution and ratio of ultrafine to fine particles in a particular particle sample.

Figure 2:
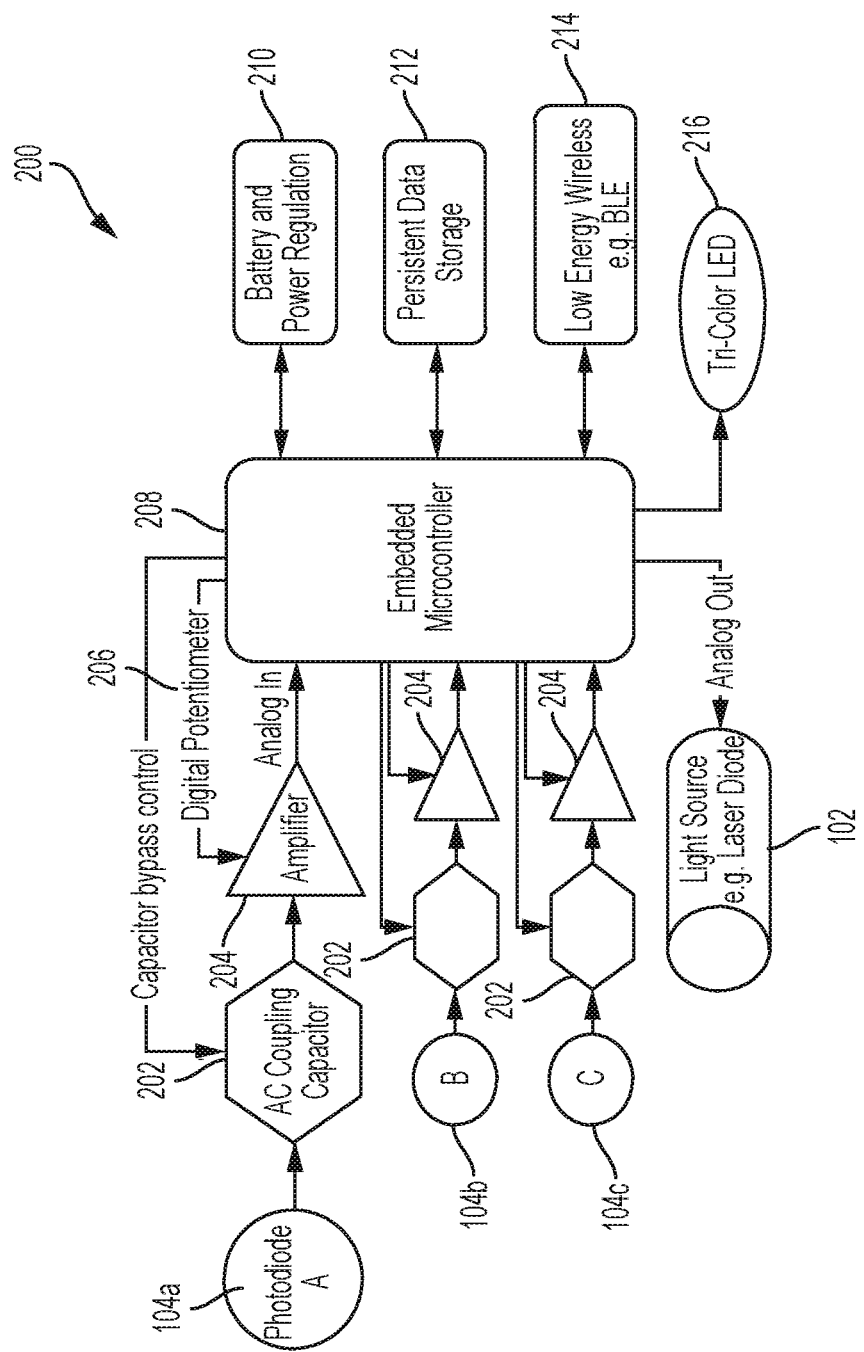
FIG. 2 is a system diagram illustrating the electronics components of an optical particle detection device according to various embodiments of the present invention.

In various embodiments, with reference to FIG. 2, the optical particle detection device 100 includes a microcontroller, such as the embedded microcontroller 208 shown in FIG. 2, that implements the technique for assessing the presence of ultrafine and fine particles. As previously described, the light source 102 can emit light that is scattered at any given scatter angle, θ, which may be measured with a corresponding photodetector 104A-C. A given scatter angle θ can define a scattering path 106, with the photodetectors 104A-C being positioned at the distal end of a corresponding scattering path 106A-C. Based on detecting photons scattered at a particular scatter angle θ, each photodetector 104A-C can produce a scattering intensity output voltage signal that is directly proportional to the intensity of the light scattered at the particular angle θ. Light emitted from the light source 102 can illuminate a plurality of particles of interest in the incoming air particle flow to the sensor device 100.

In some embodiments, to establish the model for the sensor device 100, the sizes of the particles of interest can be assumed to be distributed with a log-normal distribution defined by a number mean diameter, $d_g$, and geometric standard deviation, $\sigma_g$. In other words, the log-normal distribution defines the number of particles of particular sizes over a continuous range at a particular moment in time, based on a mean diameter value and deviation from the mean diameter value. In some embodiments, other suitable probability distributions such as the normal, bimodal, trimodal, and quadmodal distribution may be used to model the sizes of particles of interest. Diameter may be measured in cm. For this distribution, the count mean diameter, $d_{10}$, diameter of average surface area, $d_{20}$, and diameter of average mass, $d_{30}$, are defined by the following equations:

$$d_{10}=d_g \exp\{\frac{1}{2}[\ln(\sigma_g)]^2\} \quad [1]$$

$$d_{20}=d_g \exp\{[\ln(\sigma_g)]^2\} \quad [2]$$

$$d_{30}=d_g \exp\{1.5[\ln(\sigma_g)]^2\} \quad [3]$$

Based on equations [1]-[3], the mass concentration, M, of the particles may be defined as equation [4] below, which can be expressed in units of $mg/m^3$. In equation [4], M refers to the mass of particles per a particular unit volume and N refers to the total number of particles per cubic cm.

$$M=1\times 109(\pi/6)(d_{30})^3 N \quad [4]$$

The voltage generated from a photodetector 104 based on light scattered at some particular angle, θ, is defined by equation [5] below. In equation [5], $A_\theta$ is a known amplification factor that may be considered as a constant number which is independent of the selected scattering angle θ. $I_\theta$ is the normalized angular scattering intensity calculated from the Mie theory for scattering from a sphere and integrated over the given log-normal size distribution. It is known in the art that the Mie theory is a technique to compute electromagnetic scattering by a homogeneous isotropic sphere.

$$V_\theta = A_\theta (\pi/4)(d_{10})^2 N I_\theta \quad [5]$$

By dividing equation [5] by equation [4] and substituting the definitions of $d_{10}$ and $d_{30}$ from Equations [1] and [3], an equation for the voltage per unit mass concentration is determined as the following:

$$V_\theta/M=[1.5\times 10-9A\{\exp[-3.5[\ln(\sigma_g)]2]\}/d_g]I_\theta \quad [6]$$

The amount of light scattering in the optical particle detection device 100 may depend on properties such as, for example, the wavelength of light, the index of refraction (m), and particle size. Index m is a complex number that can be defined as m=n−ik, in which n denotes the real part of the complex number and k denotes the imaginary part of the complex number (i.e. the extinction coefficient). The extinction coefficient k is a measure of whether or not a particular particle absorbs any of the light energy at a given wavelength λ. As previously described, the light source 102 may emit light at any suitable wavelength such as 520 nm, 650 nm, 780 nm, or 880 nm.

As described below in connection with FIG. 1B, in other embodiments, two light sources 102 can be used with each light source 102 emitting light at a different given wavelength λ. A greater separation between wavelengths of the two light sources 102 may be advantageous for determining the mass concentration of ultrafine particles. Also, a remote processor (that is remote from the housing of the optical particle detection device 100) could be provided and programmed to improve the detection of ultrafine and fine particles in the air particle flow, such as by improving the calculation of the ultrafine mass fraction and additional metrics for air quality estimation. The remote processor may also implement machine learning and/or apply Kalman filtering, as discussed in further detail below. Using two or more light sources 102 may be useful for the remote processor to apply data fusion of the corresponding scattering intensity output signals generated based on the light from the light sources 102. Such data fusion may also improve air quality estimation. The remote processor could also be programmed to compensate for drift of the photodetectors 104A-C or other sensors (e.g., environmental sensors) of the optical particle detection device 100.

In one embodiment, a local processor is located in the housing of the optical particle detection device 100, where the local processor is programmed to provide a simple indication of air quality. For example, the local processor may be configured to compare unitless scattering intensity output signals to voltage thresholds. The remote processor may be configured to calculate the ultrafine mass fraction, $f_u$, as well as other air quality estimation metrics such as lung deposited surface area. In this way, the air quality estimation can be dynamically improved without necessarily updating the program executed by the local processor. It is also possible that no remote processor is provided and that the local processor is configured to perform the functions of the remote processor as described above.

Figure 5:
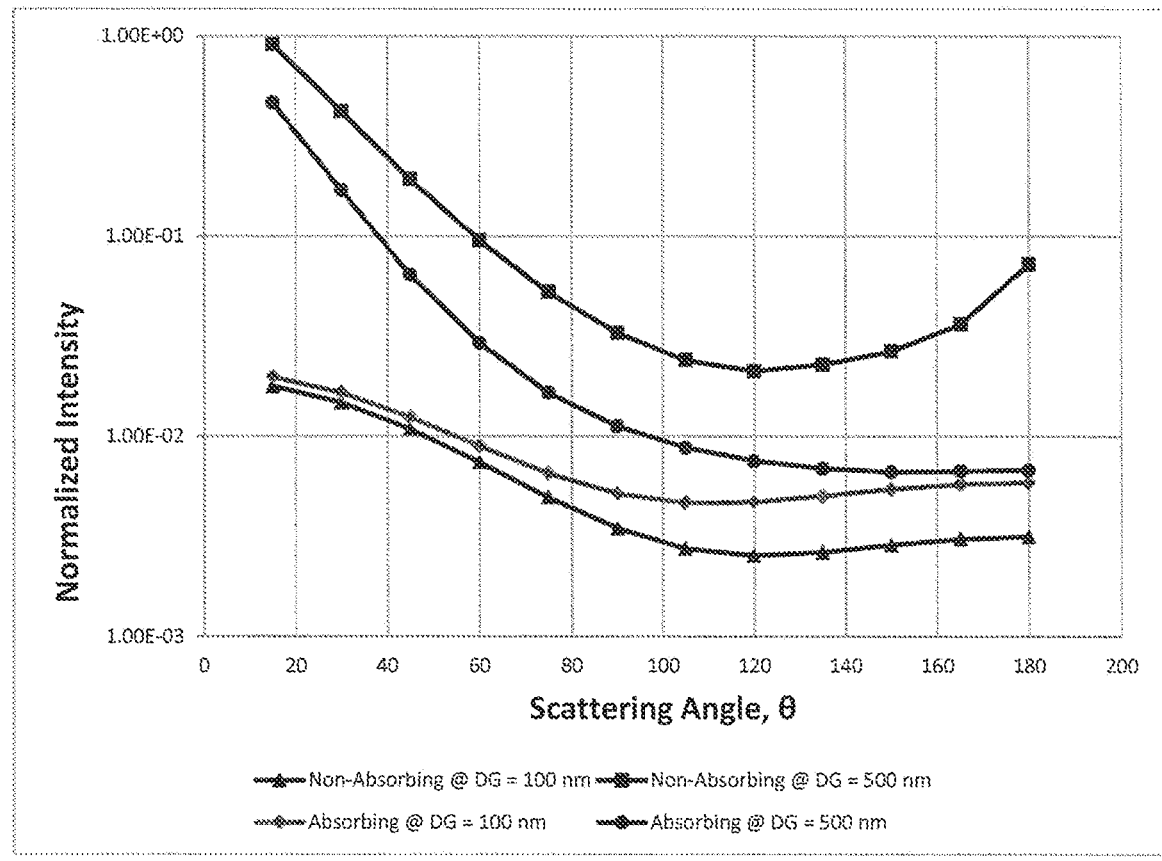
FIG. 5 is a chart illustrating the relationship between normalized scattering intensity and scattering angle for two different particle size distributions (absorbing and non-absorbing), according to various embodiments of the present invention.

FIG. 5 is a chart illustrating the relationship between normalized scattering intensity and scattering angle for two different particle size distributions (absorbing and non-absorbing), according to various embodiments of the present invention. Referring back to equation [6], for a particular particle size distribution (e.g. log-normal distribution) defined by parameters including number mean diameter $d_g$, geometric standard deviation $\sigma_g$, wavelength $\lambda$ and index m, the corresponding normalized angular scattering intensity $I_\theta$ value may be computed for any angle. For example, FIG. 5 illustrates a plot of angular scattering intensities, $I_\theta$, for two average particle diameters 100 nm ($d_{100}$) and 500 nm ($d_{500}$). Each of the diameters $d_{100}$ and $d_{500}$ may be an absorbing (m=1.613−0.795i) or non-absorbing (m=1.613) type particle. As shown in FIG. 5, the line with triangle shaped markers represents angular scattering intensities $I_\theta$ as a function of scattering angle $\theta$ for a non-absorbing $d_{100}$ particle distribution. Similarly, the line characterized by diamond shaped markers represents $I_\theta$ as a function of $\theta$ for an absorbing $d_{100}$ particle distribution, the line having circle shaped markers represents $I_\theta$ as a function of $\theta$ for an absorbing $d_{500}$ particle distribution, and the line having square shaped markers represents $I_\theta$ as a function of $\theta$ for non-absorbing $d_{100}$ particle distribution.

In the embodiment of FIG. 5, the incident wavelength $\lambda$ is 594.3 nm and particle sizes are distributed according to a log-normal particle size distribution with $\sigma_g$ equal to 1.7. For each number mean particle diameter $d_g$ (e.g., 100 nm and 500 nm shown in FIG. 5), there are differences in intensities between the absorbing and the non-absorbing particles. In addition, as shown in FIG. 5, for $d_{500}$ (absorbing or non-absorbing), scattering intensities $I_\theta$ decrease significantly as the scattering angle $\theta$ increases. In contrast, for $d_{100}$ (absorbing or non-absorbing), scattering intensities $I_\theta$ do not decrease as significantly as the forward scattering angle $\theta$ increases. In FIG. 5, normalized intensity ranges from 0.001 to 1 and scattering angle ranges from 0° to 200° degrees. The x axis represents scattering angle and the y axis represents normalized intensity. Consequently, the ratio of intensity at a small scattering angle $\theta$ (e.g., 15° or 221/2°) to intensity at a large angle (e.g., 90°) is significantly less for smaller particles than for the larger particles. For example, for an intensity ratio of 15° to 90°, the ratio equals 6.1429 (0.043/0.007) for non-absorbing $d_{100}$. In contrast, the 15° to 90° intensity ratio for non-absorbing $d_{500}$ equals 14.2857 (1/0.07). This illustrates one way the intensity ratios may be used to distinguish between the effects of air particles of differing diameters.

Figure 6:
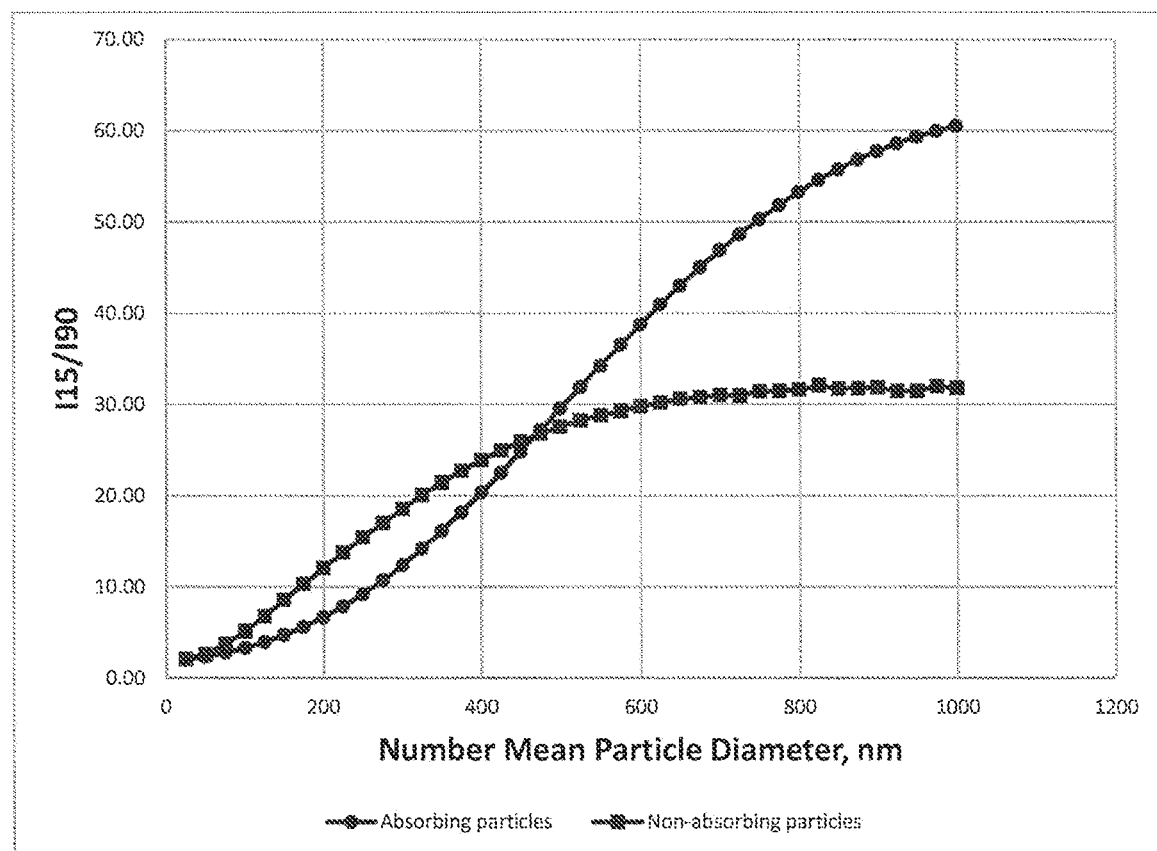
FIG. 6 is a chart illustrating the change in the intensity ratio of scattering angle 15° to scattering angle 90° as a function of the change in number mean diameter parameter $d_g$ of particle size distributions, according to various embodiments of the present invention.

FIG. 6 is a chart illustrating the change in the intensity ratio of scattering angle 15° to scattering angle 90° as a function of the change in number mean diameter parameter $d_g$ of particle size distributions, according to various embodiments of the present invention. FIG. 6 depicts the relationship of exemplary intensity ratio $I_{15}/I_{90}$ (i.e. 15° to 90°) to particle number mean diameter $d_g$ for both absorbing and non-absorbing particles. The particle number mean diameter $d_g$ is plotted on the x-axis. The intensity ratio $I_{15}/I_{90}$ is plotted on the y-axis. In FIG. 6, the number mean particle diameters on the x-axis are distributed according to a particle size distribution with standard deviation $\sigma_g$ 1.70 and at a wavelength $\lambda$ of 594.3 nm for both absorbing (m=1.613−0.795i) and non-absorbing (m=1.613) particles. On the x-axis, the mean particle diameters $d_g$ for the absorbing and non-absorbing particles range from 0 nm to 1200 nm. For absorbing particles, the ratio $I_{15}/I_{90}$ increases continuously over the range of 0 to 1000 nm, although the rate of increase changes as shown in FIG. 6. However, for non-absorbing particles, the increasing trend of ratio $I_{15}/I_{90}$ stagnates for number mean particle diameters greater than about 600 nm (i.e., between $d_{600}$ to $d_{1000}$).

In various embodiments, the optical particle detection device 100 may use these angular scattering intensity ratios $I_\theta$ to assess the levels of fine, FANU, and/or ultrafine particles that may exist as a component of $PM_{2.5}$. Equation [6] can be expanded to include more than one particle size distribution. For example, a particular total particle population may be described by a log-normal and a normal distribution. The particles may be sufficiently dilute such that multiple scattering effects can be neglected. In that case, the total voltage measured at any angle $\theta$ can be expressed as the sum of the contributions from the mass concentrations corresponding to each size distribution, as denoted below as equation [7]. Mass concentration is defined as particle mass per a unit volume of gas (e.g., gas can be the air flowing through optical particle detection device 100). Mass concentration may be measured in units such as, for example, micrograms per cubic meter (m/m³).

$$(V_\theta)TOT = A\Sigma[g(d_{gi})/d_{gi}](I_\theta)_i M_i \quad [7]$$

With reference to equation [7], the subscript i refers to a specific distribution of particle sizes such as the log-normal and normal distributions described above. For each i, there exists a defined number mean diameter, $g(d_{gi})$ that contributes a mass concentration, $M_i$, and angular intensity, $(I_\theta)_i$, such that the total mass concentration is the sum of each of the $M_i$ values. Therefore, equation [7] denotes the total angular intensity based on summing the individual contributions to total intensity by each of the multiple size distributions, at any given scattering angle. The total angular intensity is equal to the total angular intensity.

Figure 7:
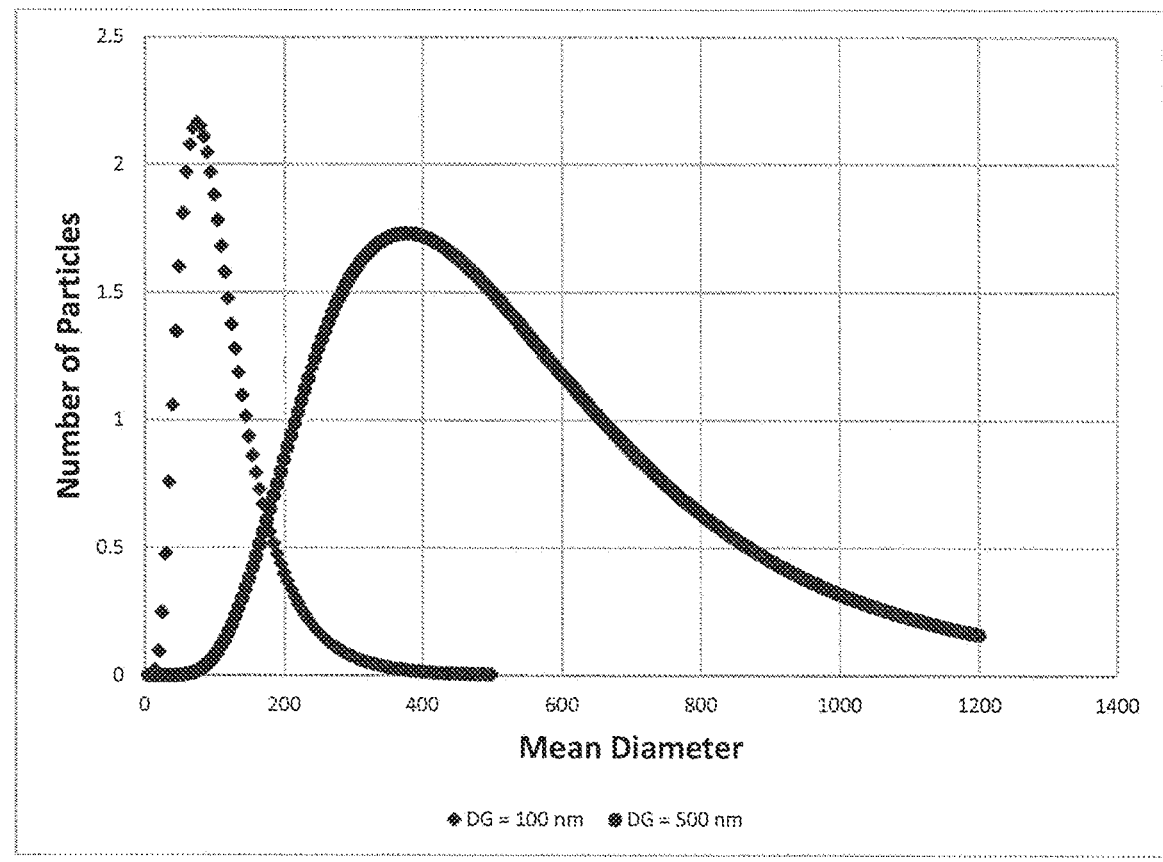
FIG. 7 is a chart illustrating the number of particles at various given diameters $d_p$ for two particle size distributions characterized by number mean diameters $d_g$ of 100 nm and 500 nm, respectively, according to various embodiments of the present invention.

FIG. 7 is a chart illustrating the number of particles at various given diameters $d_p$ for two particle size distributions characterized by number mean diameters $d_g$ of 100 nm and 500 nm, respectively, according to various embodiments of the present invention. In some embodiments, the particulate matter of a particular total particle population (i.e. a given particle mixture) comprises two distinct log-normal size particle size distributions. Specifically, one distribution contains the majority of fine particles (particles of diameters above 0.30 μm) and the second distribution contains the majority of ultrafine particles (particles of diameters below 0.30 μm). The first distribution has parameters of number mean diameter $d_g$ of 500 nm and geometric standard deviation, $\sigma_g$ of 1.7. The second distribution has parameters of $d_g$ of 100 nm and $\sigma_g$ of 1.7. Both distributions are shown in FIG. 7. The particle diameter $d_p$ is plotted on the x-axis of FIG. 7. The y-axis represents the relative number of particles at any given diameter $d_p$.

Any suitable angle may be used for scattering particles distributed according to either of the two distributions shown in FIG. 7. For example, 15° and 90° degrees may be chosen as the scattering angle. For each particle population corresponding to each of the first and second distribution, the total mass concentration, $M_{TOT}$, may equal the sum of its components. In other words, $M_{TOT}$ equals the mass concentration of ultrafine particles, $M_U$, and the mass concentration of fine particles, $M_L$. The values for $M_U$ and $M_L$ depend on the particle size ranges for ultrafine and FANU particles. In various embodiments, ultrafine particles may be defined as less than 0.3 microns or some other value. FANU particles can range in size from 0.3 microns to 2.5 microns. Similarly, the intensity at each scattering angle is the sum of the intensity scattered by the ultrafine particles and the intensity scattered by the fine particles. Thus, equation [7] can be used to calculate the corresponding output total voltage signals based on the component two voltage signals from the two different intensities corresponding to $M_U$ and $M_L$. Accordingly, the total voltage signals may be calculated using equation [8] and [9], as defined below.

$$(V_{15})TOT=C[(M_U/d_{gU})(I_{15})_U+(M_L/d_{gL})(I_{15})_L] \quad [8]$$

$$(V_{90})TOT=C[(M_U/dgU)(I_{90})_U+(M_L/d_{gL})(I_{90})_L] \quad [9]$$

In various embodiments, constant C may be considered a mathematical constant because the given particle mixture comprises log-normal distributions with equal geometric standard deviations. The particle number mean diameters $d_{gU}$ and $d_{gL}$ correspond to the mean diameters of the ultrafine and fine particles, respectively. The normalized angular scattering intensities $(I_{15})_U$ and $(I_{15})_L$ and $(I_{90})_U$ and $(I_{90})_L$, can be determined at 15° and 90°, for the ultrafine and the large particles, respectively. A particular mass fraction of ultrafine particles $f_U$ can be defined as equal to $M_U/M_{TOT}$. Thus, for embodiments consisting of a two component mixture of particle sizes (i.e. fine particles and ultrafine particles only), $1.00-f_U$ equals the mass fraction of fine particles. By defining $f_U$ in this manner, the ratio of the resultant voltages, $V_{15}/V_{90}$ may be defined independently of the total mass concentration $M_{TOT}$. Specifically, $V_{15}/V_{90}$ depends only upon the relative ratios of each mass fraction to corresponding particle number mean diameter, as shown below in equation [10].

$$V_{15}/V_{90}=[(f_U/d_{gU})(I_{15})_U+((1-f_U)/d_{gL})(I_{15})_L]/[(f_U/d_{gU})(I_{90})_U+((1-f_U)/d_{gL})(I_{90})_L] \quad [10]$$

In other embodiments, other ultrafine mass fractions could be computed additionally or alternatively to $f_U$, such as $M_U/M_L$ (which equals $f_U/(1-f_U)$) or $M_L/M_U$.

Figure 8:
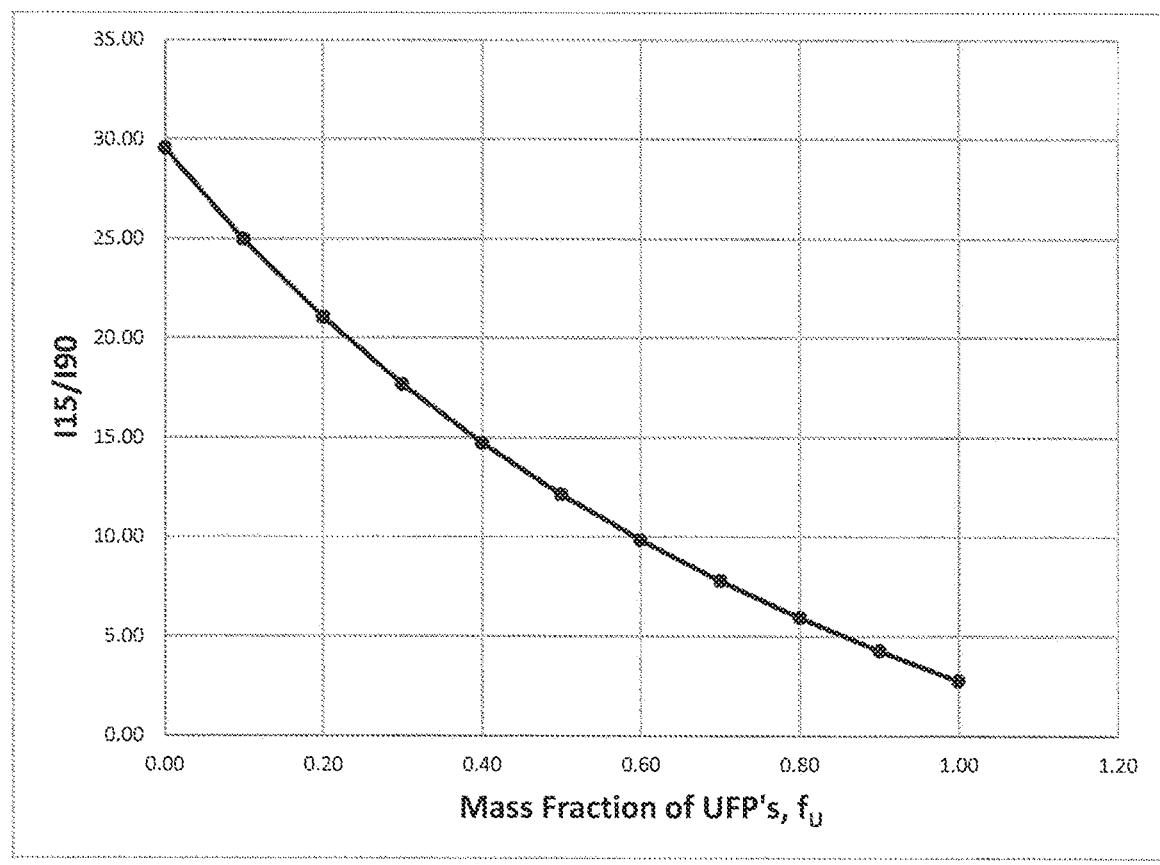
FIG. 8 is a chart illustrating the change in intensity ratio of scattering angle 15° to scattering angle 90° as a function of the change in the mass fraction of ultrafine particles $f_u$ according to various embodiments of the present invention.

FIG. 8 is a chart illustrating the change in intensity ratio of scattering angle 15° to scattering angle 90° as a function of the change in the mass fraction of ultrafine particles $f_u$ according to various embodiments of the present invention. In other words, the intensity ratio as calculated using equation [10] is plotted against the ultrafine mass fraction, $f_U$. The intensity ratio $I_{15}/I_{90}$ is plotted on the y-axis. The ultrafine mass fraction $f_U$ is plotted on the x-axis. In one embodiment, $d_{gU}$ equals 100 nm and $d_{gL}$ equals 500 nm. In addition, the particles distributed according to $d_{gU}$ and $d_{gL}$ may be absorbing particles (m=1.613−0.795i). As can be seen in FIG. 8, the ratio $I_{15}/I_{90}$ equals the ratio of $(I_{15})_L$ to $(I_{90})_L$ when $f_U$ is equal to zero. Stated differently, the ratio $I_{15}/I_{90}$ is the intensity ratio for only the fine particles when $f_U$ equals zero. However, as the mass fraction of ultrafine particles increases, the ratio decreases gradually such that the ratio $I_{15}/I_{90}$ is the ratio for ultrafine particles only when $f_U$ is one. Specifically, when $f_U$ is one, the ratio equals $(I_{15})_U$ to $(I_{90})_U$. For the exemplary embodiment of FIG. 8, the ratio $I_{15}/I_{90}$ experiences an order of magnitude decrease in ratio from 29.55 (purely FANU particles) to a value of 2.78 (ultrafine particles only). Ultrafine mass fraction, $f_U$, is an important parameter that may be useful for gaining insights into air quality and adverse health that may not be determined from conventional $PM_{2.5}$ measurements. Fraction $f_U$ can be especially important at lower values of total mass concentration and at $PM_{2.5}$ levels that may fall below the limits of 12 μg/m³ and 35 μg/m³. These levels may be employed as thresholds to trigger changes in a display that is communicatively coupled to the optical particle detection device 100. That is, the limits 12 μg/m³ and 35 μg/m³ can be considered safety thresholds for indicating safe mass concentration levels. The display could also be integrated into the housing of the optical particle detection device 100 itself.

Figure 1A:
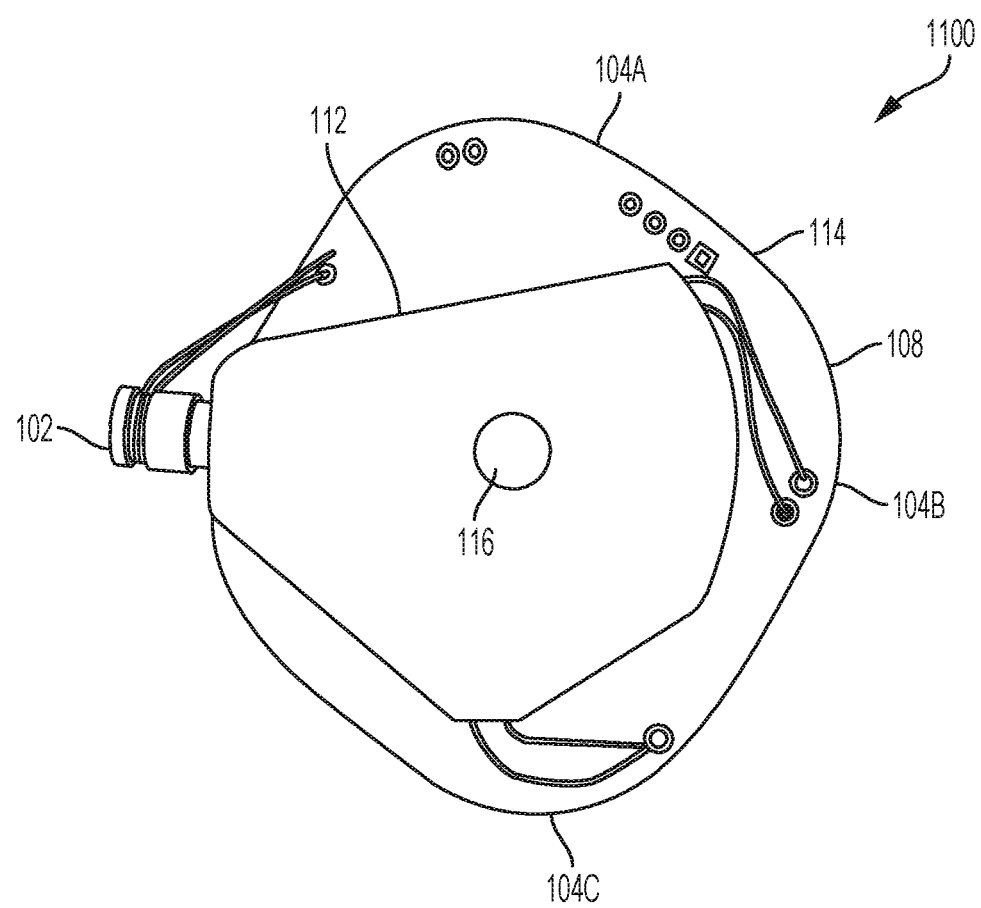
FIG. 1A is an illustration of an optical particle detection device according to various embodiments of the present invention.

FIG. 1A illustrates another aspect of the optical particle detection device 100 according to various embodiments of the present invention. The depicted sensor device 100 includes a sensor housing 112 mounted to a printed circuit board 114. The sensor housing 112 may include the light source 102 on the left side and the light escape 108 on the right side, with the photodetectors 104A-C located at various angles relative to the light path as described above. The various angles define light paths, or electromagnetic radiation paths generally (e.g., scattering paths 106A-C). The air particle flow to be sensed may enter the sensor housing 112 through the opening 116 in the top center of the housing 112, with a corresponding opening (not shown) on the other side of the housing 112 and circuit board 114. In this way, the housing 112 can define a detection zone through which the air particle flow flows. In one embodiment, a may be placed between some or all photodetectors 104A-C (e.g., in front of a photodetector 104A-C) and the detection zone in order to maximize the total area across which light scattering is measured or interrogated. That is, the lens(es) can be used to increase the area of the detection zone for their corresponding photodetector 104. In addition, one or more lens may be placed between the light source 102 and the detection zone in order to increase the strength of the light directed to the detection zone. Specifically, the lens in front of the laser may increase the energy strength of the light impacting the air particle flow, which may improve the sensing of by the photodetectors 104A-C.

Preferably the device 100, e.g., the combination of the sensor housing 112 and the circuit board 114, is both small (e.g., 2" inches across or less for its longest dimension) and operates at low power levels, e.g., 80 milliamperes (mA) at 5.1 volts (V) or 0.40 watts (W). The small dimensions may be advantageous, for example, because of efficiency in power usage and management and portability. In contrast to existing particle detection devices, the optical particle detection device 100 applies energy usage management that, for example, enables mobile applications. For example, the processor (e.g., microprocessor, microcontroller) of the optical particle detection device 100 could execute power duty cycling and conserve power by only transmitting updated sensed scattering output signals and other air quality estimation data to the remote processor (e.g., of a cloud computing system) when such transmission is necessary. In this way, only dynamic information reflecting a change in an air quality indication may be transmitted by the optical particle detection device 100, as described in further detail below. In some embodiments, the light source 102 may be a suitable external laser, such as, for example, a surface mounted laser that is mounted to the circuit board 114, for example. A surface mounted laser can be useful for reducing the size of the housing 112 of the device 100. Reduction in the size of the device 100 should be combined with an increased noise threshold such that undesirable optical features are not sensed. The housing 112 may be made from any suitable material, preferably one with low light-transmissivity, such as an acryl material. The housing 112 can be manufactured using stereolithography or other suitable three dimensional printing techniques, or other fabrication methods may also be used.

Electronic components for the sensor device 100 can be mounted to the printed circuit board (PCB) 114, such as on the side opposite the side to which the housing 112 is mounted. The electronic components (not shown) may comprise a microprocessor, a memory device, and a wireless communication module or chip (integrated circuit). The microprocessor may be coupled to the memory device, for example, and the memory device can be internal and/or external to the processor. Alternatively, the microprocessor may be replaced with an embedded microcontroller, as shown in FIG. 2. The housing 112 may also comprise other circuit boards such that the microprocessor may be embedded to these circuit boards. The housing 112 may further comprise a wireless communication circuit, such as the wireless communication module described above. The wireless communication module can be, for example, a Bluetooth device that enables Bluetooth Low Energy (BLE) radio frequency (RF) wireless communications by the sensor device 100. In this way, the device 100 may be in wireless communication with the microprocessor (e.g., local processor) as well as in communication with a remote processor if such a remote processor is provided. In various embodiments, the sensor device 100 may comprise one or more additional sensors, such as a volatile organic compound (VOC) sensor. VOCs are large molecules (i.e., with diameters greater than $PM_{2.5}$) with high light absorption characteristics. VOCs are volatile at ambient conditions and are therefore potentially harmful.

In addition to or in lieu of VOC sensors, the device 100 may comprise other types of environmental sensors, such as temperature sensors, humidity sensors, and/or pressure sensors. Each of the sensors as well as the photodetectors 104A-C may be modular. That is, these additional sensors and photodetectors 104 may be removable and replaceable in the housing in the event that the sensors foul or reach some other defective status. For example, when a sensor fouls beyond compensation, only the portion of the device 100 requiring replacement (the fouled sensor) requires removal and replacement. By replacing only the defective sensor, waste and cost may be reduced or avoided altogether. In this connection, the processor or remote processor may be configured to execute a program to determine sensor fouling. For example, the program could be executed to determine when compensation of the output scattering intensity signal or other sensor signal from the sensors has reached a predetermined threshold indicative of sensor fouling. It is also possible that other components aside from the sensors of the modular device 100 may be modular. For example, the light source and processor of the optical particle detection device 100 could also be removable and replaceable. The environmental sensors may output a signal indicative of an environmental parameter such as temperature or humidity. This environmental parameter could be used in a drift compensation process. For example, the processor could compensate for the sensed environmental parameter in the calculation of the mass fraction of ultrafine air particles to fine air particles.

In some embodiments, the optical particle detection device 100 comprises a display, such as a touchscreen display or a set of lights (e.g., LEDs), for visual user feedback about the detection of FANU or ultrafine particles optical particle detection device 100. As discussed above, in some embodiments, the optical particle detection device 100 comprises a processor mounted in the housing 112 as well as a remote processor. Such a remote processor may be part of a remote electronic device (e.g., a laptop, mobile phone, a computing device) or cloud computing system. The local processor mounted in the housing 112 may be configured to control the display. Alternatively, the local processor may control the display in conjunction with the remote processor. In one embodiment, the local processor may control the display to display a warning when a predetermined threshold is reached. For example, the local processor could compare a unitless value to a predetermined threshold or produce a value with units for displaying an indication of air quality on the display. In particular, the local processor could simply compare the scattering intensity output signals to an appropriate threshold, calculate and compare the mass fraction of ultrafine particles to fine air particles, or calculate and compare a lung deposited surface area metric to a threshold. The degree of complexity of the operations executed by the local processor may depend on the complexity of the operations executed by the local processor. Accordingly, for example, the local processor may use linear approximation to compare the scattering intensity output signals to a predetermined threshold, while the remote processor generates an indication or more complex metrics of air quality using data fusion and drift compensation.

The display may be onboard the device 100 or remote to the device 100. An onboard device may be configured to generate immediate feedback. The feedback may be raw data such as $f_U$ values. Additionally or alternatively, the display may provide a warning when $f_U$ exceeds a certain threshold, such as 40%. The threshold may be useful for establishing a baseline air quality such that when new environmental stimuli (e.g. a power plant) are introduced, the baseline can be used to determine the impact of the new environmental stimuli. In one embodiment, the display depicts a representation of a function of $f_u$. The representation may be graphical or non-graphical. For example, in one embodiment, the display may be a tri-colored LED in which each color represents different information about air quality based on fine or ultrafine particle detection. The local processor could use three thresholds, for example, to display three different warnings or indications of air quality based on the scattering intensity output signals reaching the three thresholds. Three different lights, such as red, green, and blue, could be used to indicate low, medium, and high air particle pollution (e.g., proportion of ultrafine and fine air particles in the area that the device 100 is used). Also, for example, green may represent a warning that fine or ultrafine particle detection may soon exceed a predetermined threshold and red may represent an alarm that the predetermined threshold has been exceeded. Other colors of the display diode could also be used. Additionally or alternatively, the display may depict change in $f_u$ over time. For example, the display may show an increasing trend in the computed value of $f_u$ or that the value of $f_u$ exceeds a predetermined threshold to indicate an undesirable or dangerous level of pollution in the corresponding environment that the device 100 is located in.

Figure 1B:
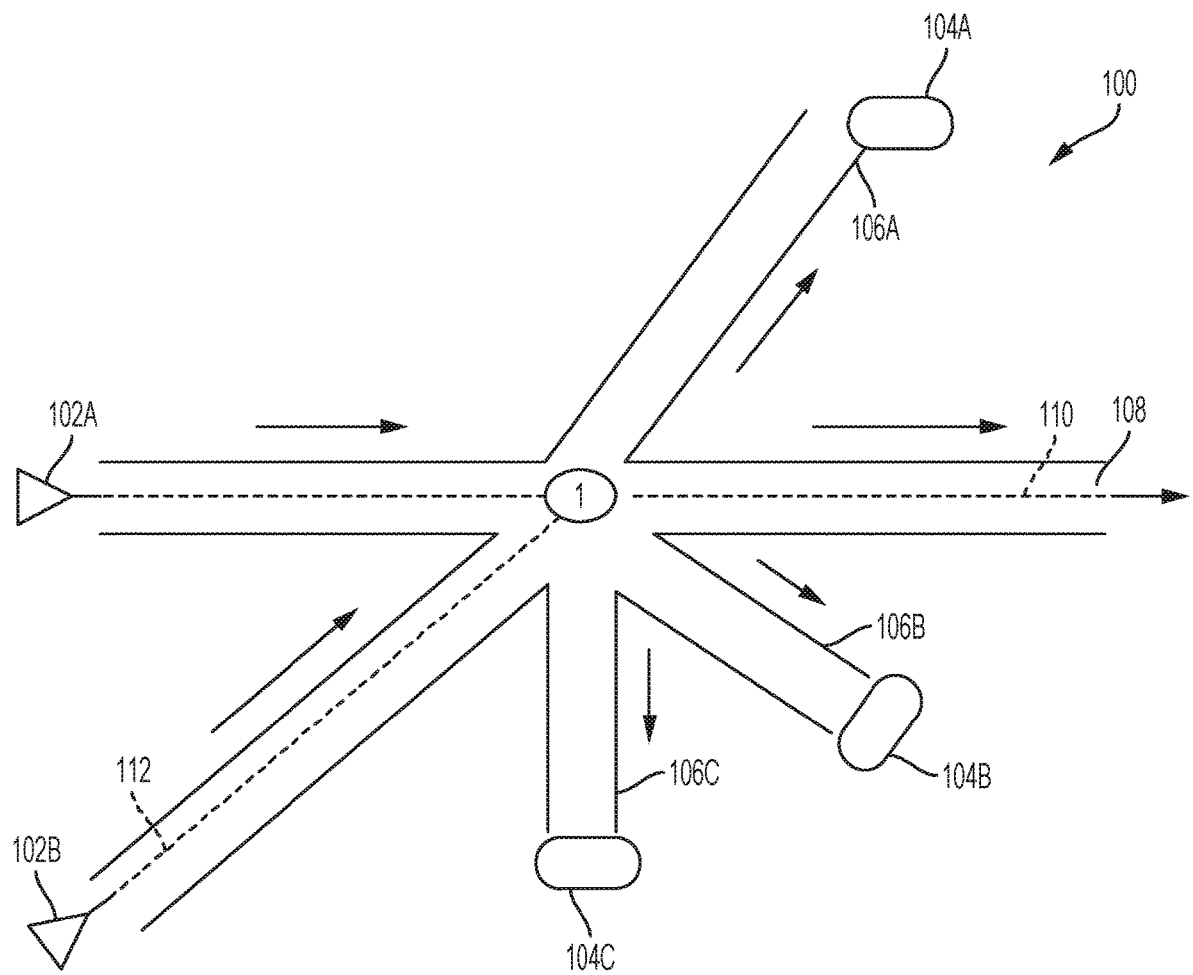
FIG. 1B is another illustration of an embodiment of the physical device geometry of an optical particle detection device for detecting both fine and ultrafine particulates using scattered light behavior according to various embodiments of the present invention.

Another embodiment of the optical particle detection device 100 is shown in FIG. 1B. The device 100 shown in FIG. 1B is similar to the device 100 shown in FIG. 1, except that the device shown in FIG. 1B includes multiple light sources 102A, 102B that emit light to impact the particle in the device's incoming airflow. As shown in FIG. 1B, the second light source 102B is non-colinear with the light path 110 of the first light source 102A. For example, the second light source 102B could be offset by 45 degrees relative to the path 110 for the first light source 102A. The light sources 102A, 102B may emit light at the same, or preferably different, wavelength bands. In addition, the light sources 102A, 102B may be turned on alternately so that the measurements by each photodetector 104A-C for each light source 102A, 102B can be obtained. The results from these measurements can be combined (e.g., averaged) to compute the $f_u$ and fine levels of particulate matter in the incoming airflow as described above.

In one embodiment, the airflow (e.g., air particle flow) can be amplified using a fan, such as a micro-fan (e.g., a MEMS fan) in the housing. The fan may be configured to control the air particle flow in the measuring or detection zone. For example, the fan can titrate or control the amount of air particle flow entering the opening 116 of the optical particle detection device 100 based on a speed and direction at which the rotors of the fan rotate. In particular, the fan may also increase the signal to noise ratio of the photodetectors 104A-C by boosting the total number of particles in the air particle flow interrogated per unit time. The speed, direction, and other parameters of the fan could be controlled by the local processor, or the fan may be a remote device to the housing 112. Also, the optical particle detection device 100 may comprise a digital potentiometer to dynamically adjust amplifier gain of the photodetectors 104A-C.

In various embodiments, the microprocessor may use a Kalman filter to combine the outputs from photodetectors 104A-C. Moreover, the sensor device 100 may comprise additional sensors such as temperature, humidity, and pressure sensors such that a Kalman filter may be applied to a series of sensed temperature, humidity and pressure values. In this way, it may be advantageous to have multiple photodetectors and other sensors in the optical particle detection device 100 so that correlations between sensed outputs and parameters may be used in Kalman filter (or machine learning) to improve the air quality model implemented by the processor. The Kalman filter can apply a predictive model based on new data values and correlations between variables. Kalman filtering may be used to improve air quality estimation by adapting to historical measured air quality dynamics. This estimate may also be further improved by using machine learning to compensate for the effects of temperature, humidity, and pressure on the optical particle detection device 100 response (e.g., the scattering intensity output signals, mass fraction of ultrafine air particles to fine air particles, lung deposited surface area, and other air quality metrics).

Data sent to the cloud may be used to improve sensor models across every device 100 operating in similar environments. These algorithms may be based in the cloud or on the mobile device of a user, which enables algorithm improvement and iteration with further research without the need to replace hardware. In other words, the Kalman filter (or machine learning implemented by the remote processor, for example) enables improved air quality estimation based on using the scattered light measurement as described previously, in conjunction with the history of scattered light measurement response, and temperature, humidity, and pressure. The optical particle detection device 100 may include a battery power source. In one embodiment, the microprocessor may execute a power control algorithm to maximize the lifespan of the battery power source based on dynamic sampling intervals. The dynamic sampling intervals may be time, data, and pre-data based dynamic sampling intervals.

Referring back to FIG. 1, to test the optical particle detection device 100, prototype sensors with a small diode laser light source 102 with an output wavelength of 650 nm and photodetectors 104A-C located at discrete angles of 22 1/2°, 45°, and 90° were used. To test the sensor, a model 3075 Constant Output Atomizer and a model 3074 Evaporation Condensation Apparatus, both available from TSI, Inc. of Shoreview, Minn., were used to produce aerosols from solutions of dioctyl phthalate (DOP) in ethanol. By varying the DOP concentrations, particle diameters with very narrow size distributions and number mean diameters $d_g$ ranging from tens of nanometers to several hundred nanometers were produced. For the initial experiments, particles with number mean diameters $d_g$ of 100 nm, 180 nm, and 500 nm were generated and subsequently exposed to the prototype multi-angle sensor. In addition, the prototype sensor was also exposed to $d_{800}$ particles from "canned smoke," an aerosol used to test the functionality of smoke detectors used as fire alarm devices. The canned smoke aerosol was a SDi Solo Non-Flammable A4 Aerosol Smoke Detector Tester 8.5 oz can available from SDi, LLC of Wall Township, N.J.

Figure 9:
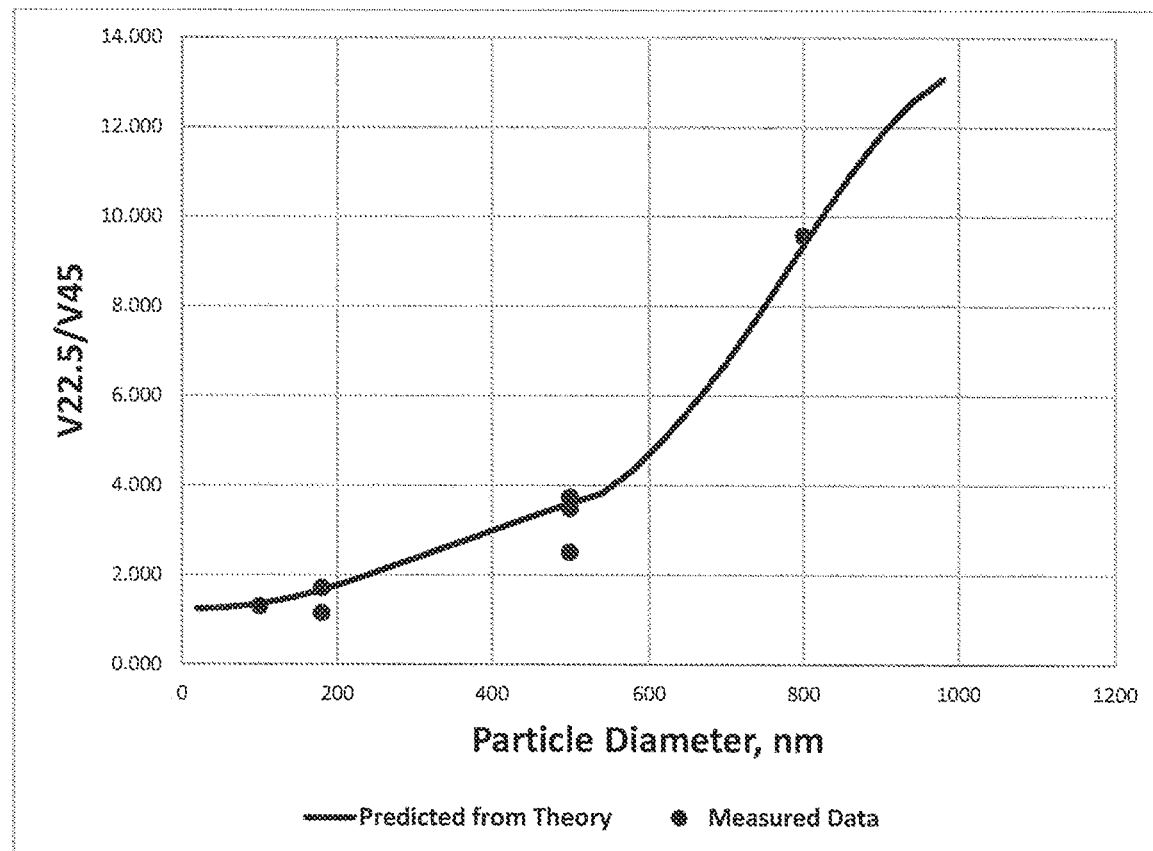
FIG. 9 is a chart illustrating the change in voltage ratio at scattering angle 22.5° to 45° as a function of particle diameters as (i) predicted from the Mie theory and (ii) determined from the measured data of the optical particle detection device, according to various embodiments of the present invention.
Figure 10:
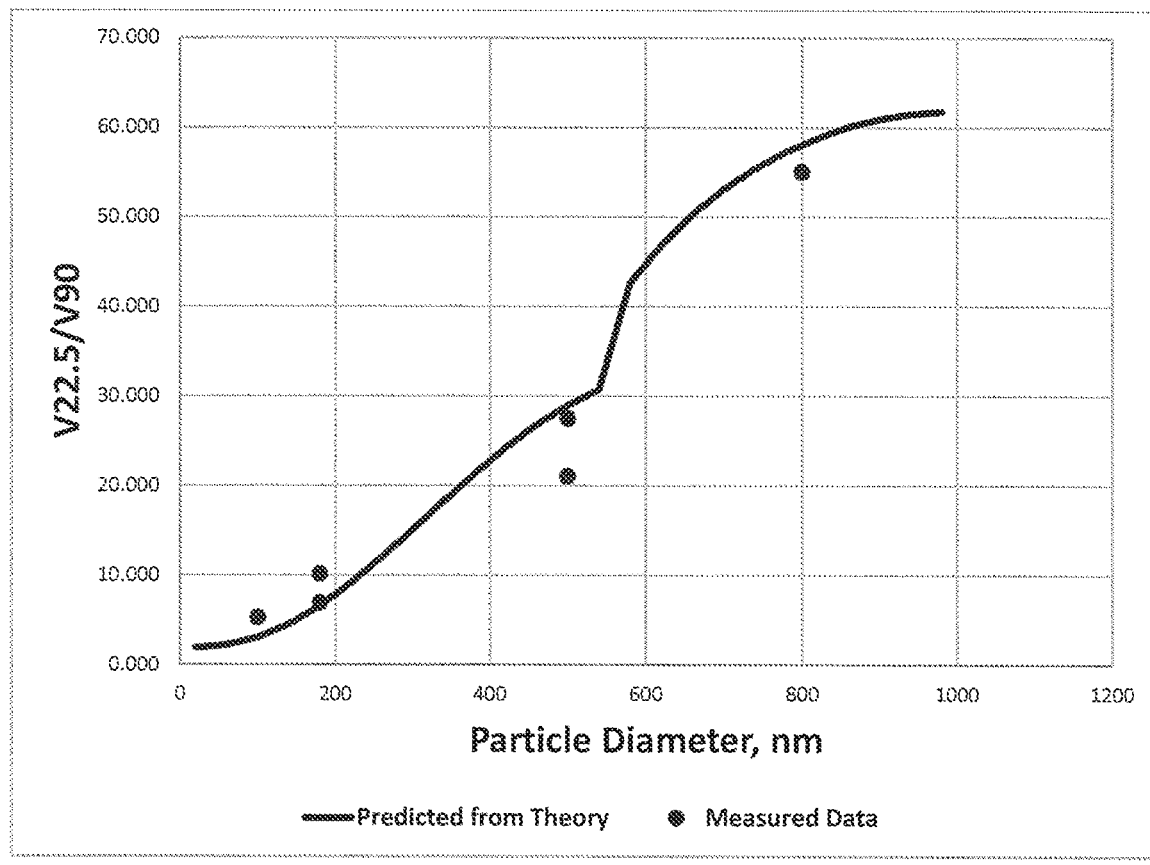
FIG. 10 is a chart illustrating the change in voltage ratio at scattering angle 22.5° to 90° as a function of particle diameters as (i) predicted from the Mie theory and (ii) determined from the measured data of the optical particle detection device, according to various embodiments of the present invention.

Referring now to FIGS. 9 and 10, for a range of particle diameters spanning 0 nm to 1200 nm, the resultant measured ratios (i.e. resultant voltages ratios) were compared to the calculated ratios based on Mie scattering theory for spheres. FIG. 9 is a chart illustrating the change in voltage ratio at scattering angle 22.5° to 45° as a function of particle diameters as (i) predicted from the Mie theory and (ii) determined from the measured data of the optical particle detection device, according to various embodiments of the present invention. FIG. 10 is a chart illustrating the change in voltage ratio at scattering angle 22.5° to 90° as a function of particle diameters as (i) predicted from the Mie theory and (ii) determined from the measured data of the optical particle detection device, according to various embodiments of the present invention. FIGS. 9 and 10 depict a comparison of the calculated voltage ratios determined based on the scattering intensity output signals of the optical particle detection device 100 with the voltages ratios predicted from the Mie scattering theory. For both FIGS. 9 and 10, particle diameter is plotted on the x-axis while the resultant voltages ratios are plotted on the y-axis.

Specifically, FIG. 9 shows that the calculated voltage ratios, $V_{22.5}/V_{90}$ compare favorably to the voltage ratios predicted based on the Mie theory. FIG. 10 similarly shows the calculated voltage ratios, $V_{22.5}/V_{45}$ compare favorably to the voltage ratios predicted based on the Mie theory. As can be seen in FIGS. 9 and 10, the theoretical voltage ratios change abruptly at a particle diameter around 540 nm. Specifically, the rate of increase in theoretical voltage ratios significantly increases for particle diameters greater than 540 nm. This is because for particles smaller than 540 nm, the index of refraction for DOP (m=1.486−0.001i), was used for the theoretical calculations. In contrast, for particles larger than 540 nm, the index of refraction for a moderately absorbing carbonaceous aerosol (m=1.65−0.25i), was used for the canned smoke aerosol. The significant increase in theoretical voltage ratios corresponds to the significant increase in measured voltage ratios. For example, as seen in Chart 6, a ratio equivalent to between 20 to 30 for a particle diameter of 540 nm increases to approximately 55 for a particle diameter of 800 nm. The data illustrated by FIGS. 9 and 10 indicates that using measured voltage ratios based on scattering intensity output signals is a valid method of predicting particle diameters, such as particle diameters in an air particle flow in the detection zone.

Additionally or alternatively, the optical particle detection device 100 as described previously may be used to calculate the surface area of particles for assessing the concentrations of ultrafine particles that exist either separately or as some component of measured $PM_{2.5}$. As described previously, the optical particle detection device 100 can implement a technique comprising the measurement of scattering intensities at two or more forward scattering angles combined with the ratios of the intensities for the angles used. These ratios provide a convenient marker for assessing the presence of ultrafine particles in the air being sampled. FIGS. 9 and 10 establish that experimentally computing ratios corresponding to measured angular intensities as previously described yields measured intensity/voltage ratios that are equal or substantially similar to the ratios that calculated using the classical Mie theory for scattering from spherical particles. Some initial experiments that were conducted using very narrowly dispersed particles over the diameter range from about 100 nm to about 800 nm yielded data that were in strong agreement with the theoretically predicted results, thus serving as additional validation that this technique is on a sound scientific footing.

Thus, the scattering intensities at various forward scattering angles when ultrafine particles are present with mass concentrations may be a reliable measure in the range of approximately about in the 1 to 10 µg/m³ range when the particles of interest lie in the particle size range from about 10 to 300 nm. Intensity/voltage ratios for the different angles can be reliably calculated in this range. The ratios may be used to determine the mass fraction of ultrafine particles, $f_u$. In general, as intensity/voltage ratios decrease, $f_u$ increases. It is known that mass may be a metric used to measure and describe particulate matter suspended in the atmosphere. For example, for a measured $PM_{2.5}$ mass concentration of 5.0 µg/m³ (and whatever the average particle size is) with a particle size distributed according to a lognormal distribution with a geometric standard deviation of $\sigma_g$=1.70, the resultant number and surface concentrations can be calculated as a function of the number mean diameter, $d_g$. All instances of particle mass may be contained in this distribution. Plots of number and surface concentrations as a function of number mean particle diameter $d_g$ can be constructed. However, surface area may also be used to measure and describe particulate matter.

Although the mass and surface area metrics may be used to measure the numbers and surfaces of particles for a particular air sample that people are exposed to, this exposure quantification does not include consideration of whether the exposed particles remain within a person's body. Specifically, the numbers and surfaces that a person is exposed to do not necessarily remain within the respiratory tract because when persons breathe in and out, only a fraction of the particles remain within a person's body. The non-remaining particles are expelled back into the surrounding atmosphere, such as by exhalation by the person. The deposition fraction (DF) may quantify the numbers and surfaces of the particles actually retained by a person. Additionally, DF may indicate how such retention changes with particle diameter. In one embodiment, the remote processor may be programmed to calculate additional air quality metrics (beyond those calculated by the local processor) such as DF or lung deposited surface area. These metrics which may be indicative of whether and how long ultrafine and fine particles remain within the person's body could be used in a Kalman filtering or machine learning processor to improve the air quality estimation/indication modeling implemented by the optical particle detection device 100.

Analytical expressions that indicate the fractions of particles deposited within the respiratory tract as a function of particle diameter can be used. These expressions have been shown to agree remarkably well with experimental measurements. One such expression that reliably predicts the measured deposition fractions as a function of particle diameter, $d_p$, (µm), is given below, as denoted by equation [11].

$$DF=0.0587+0.911/(1+\exp(4.77+1.485 \ln dp))+0.943/(1+\exp(0.508-2.58 \ln dp)) \quad [11]$$

Figure 11:
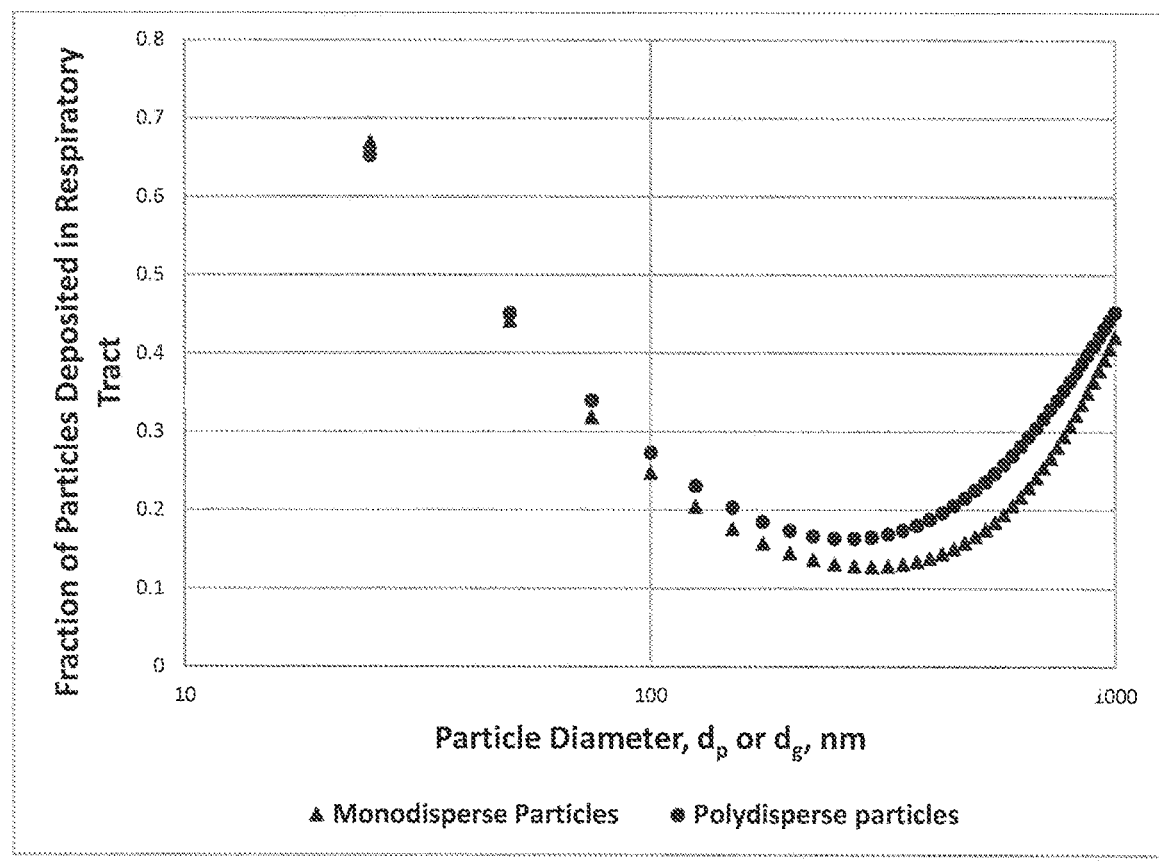
FIG. 11 is a chart illustrating the change in the fraction of particles deposited in a person's respiratory tract DF as a function of particle diameter $d_p$ for monodisperse particles and as a function of number mean diameter $d_g$ for polydisperse particles, according to various embodiments of the present invention.

Using the DF expression of equation [11], the fraction of the number of particles deposited may be plotted against (as a function of) particle diameter or number mean diameter $d_g$ over the diameter range from 25 nm to 1000 nm. FIG. 11 is a chart illustrating the change in the fraction of particles deposited in a person's respiratory tract DF as a function of particle diameter $d_p$ for monodisperse particles and as a function of number mean diameter $d_g$ for polydisperse particles, according to various embodiments of the present invention. The y-axis denotes the fraction of particles deposited in the respiratory tract as a function of particle diameter for both monodisperse and polydisperse particles. Monodisperse particle refers to air particle flows containing only one particle diameter while polydisperse refers to air particle flows containing multiple particle diameters which may be characterized by the number mean diameter $d_g$. The fraction values range from 0 to 0.8. The x axis denotes particle diameter $d_p$ (for monodisperse particles) or $d_g$ (for polydisperse particles) ranging from 10 to 1000 nm. For the polydisperse particles, the geometric standard deviation is $\sigma_g$=1.70. Particles with diameters less than about 350 nm may be deposited primarily in the lung while larger particles may be deposited in the parts of the respiratory tract connecting into the lung.

Figure 12:
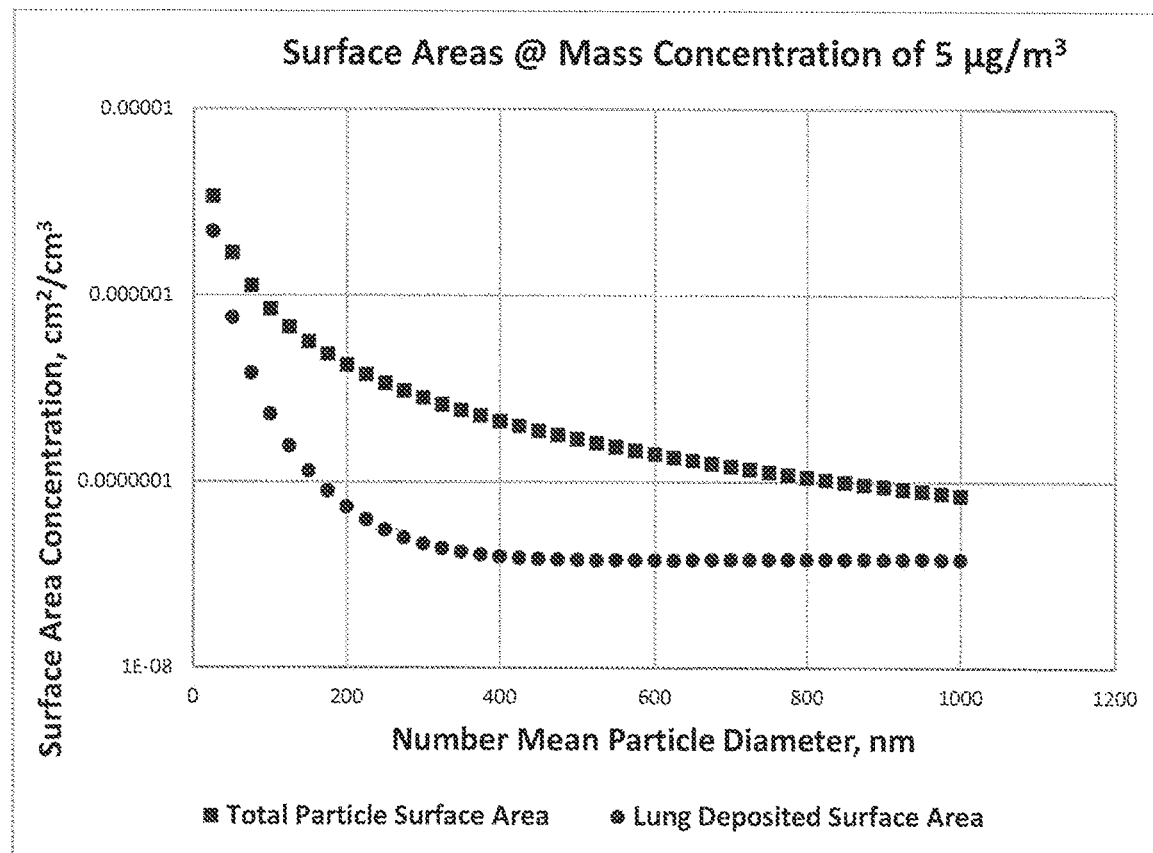
FIG. 12 is a chart illustrating the change in surface area concentration as a function of number mean diameter $d_g$ for polydisperse particles with respect to total particle surface area and lung deposited surface area, according to various embodiments of the present invention.

The deposition fraction may be applied to determine the actual surface area deposited in the lung, as shown in FIG. 12 below. FIG. 12 is a chart illustrating the change in surface area concentration as a function of number mean diameter $d_g$ for polydisperse particles with respect to total particle surface area and lung deposited surface area, according to various embodiments of the present invention. FIG. 12 plots total particle surface area concentration (i.e. available surface area per unit volume) against number mean particle diameter for polydisperse particles with $\sigma_g$=1.70. The total particle surface area is the surface in the atmosphere that a person breathes in. The lung deposited surface area is the total surface area deposited in the lungs, which may be used as an indicator of the air quality in the surrounding environment. As illustrated by the total particle surface area curve of FIG. 12, the total surface area available as a function of particle diameter continually decreases as the average diameter increases, as long as the mass concentration remains constant. In addition, for the calculated numbers of particles that are retained in the respiratory tract (i.e. the deposited particles), surface area concentrations can be calculated based upon the fraction retained. The lung deposited surface area curve is plotted based on these calculations. For particles with number mean diameters $d_g$ greater than approximately 350 nm, the lung deposited surface area (LDSA) is constant, independent of the particle diameter. This is advantageous because for air particle flows comprising particulate matter defined by $d_g$ greater than 350 nm, any measurement of an intensity ratio may be directly converted from mass concentration to surface area concentration.

Similarly, FIG. 12 also shows that for two particle samples with identical mass concentration M, a decrease in the number mean particle diameter from 350 nm to 25 nm corresponds to an increase in the LDSA by a factor of 50. In other words, for a 5 µg/m³ mass concentration first particle sample with mean particle diameter of 25 nm and a 250

μg/m³ mass concentration second particle sample with mean particle diameter greater than approximately 350 nm, the LDSA values of the first and second particle sample are equivalent. This relationship emphasizes the importance of detecting the presence of ultrafine and fine particles and the corresponding LDSA for those particles. As previously stated, the optical particle detection device 100 may detect the presence of ultrafine particles based on surface area of particles. Specifically, intensity ratios may be calculated as a function of particle diameter using the classical Mie scattering theory and subsequently surface concentrations may be assessed based upon the particle diameter. The ratios may be used to determine the approximate number mean diameter. The surface concentration may be calculated from the scaled approximate number mean diameter (i.e., scaled appropriately for the total mass concentration).

Figure 13:
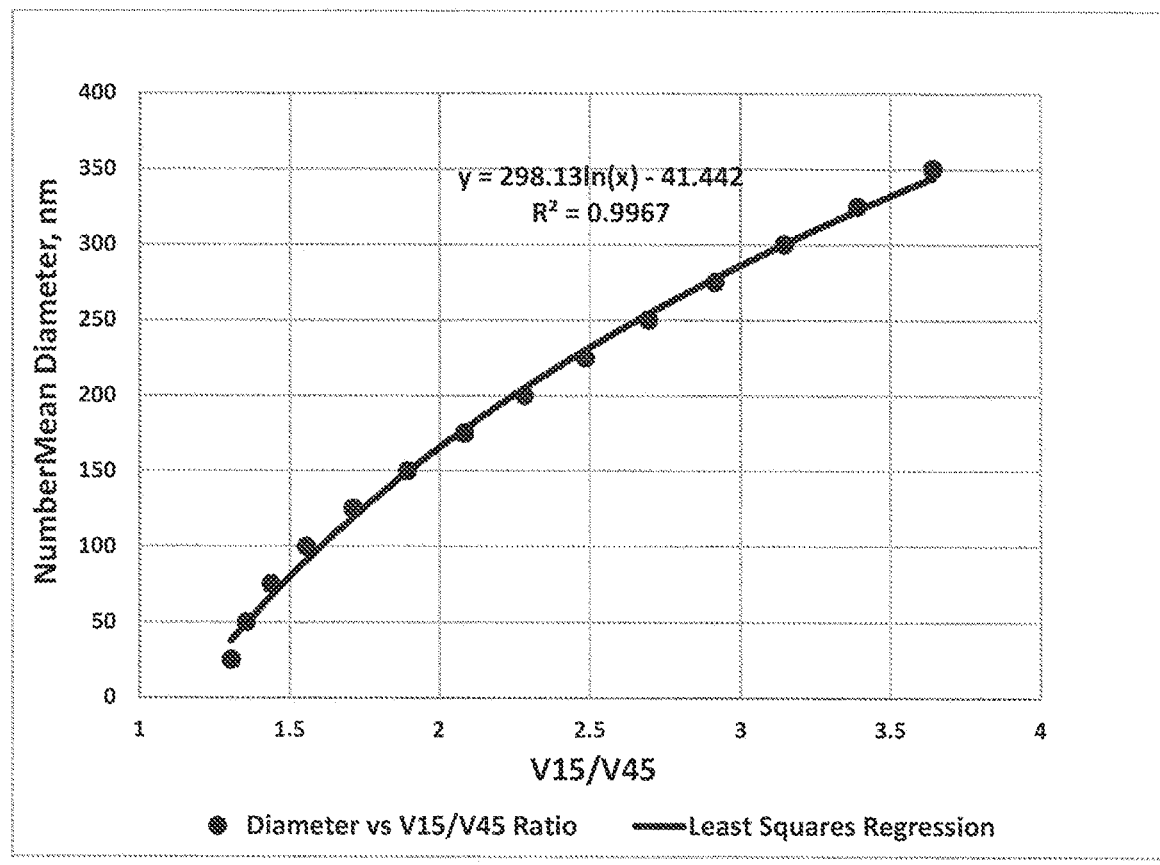
FIG. 13 is a chart illustrating the change in number mean diameter $d_g$ of particle size distributions as a function of the voltage ratio at scattering angle 15° to 45° and illustrating the application of least squares regression, according to various embodiments of the present invention.

FIG. 13 is a chart illustrating the change in number mean diameter $d_g$ of particle size distributions as a function of the voltage ratio at scattering angle 15° to 45° and illustrating the application of least squares regression, according to various embodiments of the present invention. As shown in FIG. 13, the number mean diameter is plotted against the calculated $V_{15}/V_{45}$ ratio for particles distributed according to a lognormal distribution with a geometric standard deviation of $\sigma_g=1.70$. The x-axis denotes the $V_{15}/V_{45}$ ratio and ranges from 1 to 4. The y-axis denotes the number mean diameter and ranges from 0 to 400 nm. The mean diameter is plotted against the $V_{15}/V_{45}$ ratio for particles ranging less than 350 nm. A least squares regression was performed to graphically represent the positive correlation and relationship between the number mean diameter and the calculated $V_{15}/V_{45}$ ratio. Specifically, as the number mean diameter increases, the calculated ratio also increases. The ratios $V_{15}/V_{45}$ represent the average for both absorbing and non-absorbing particles.

Figure 14:
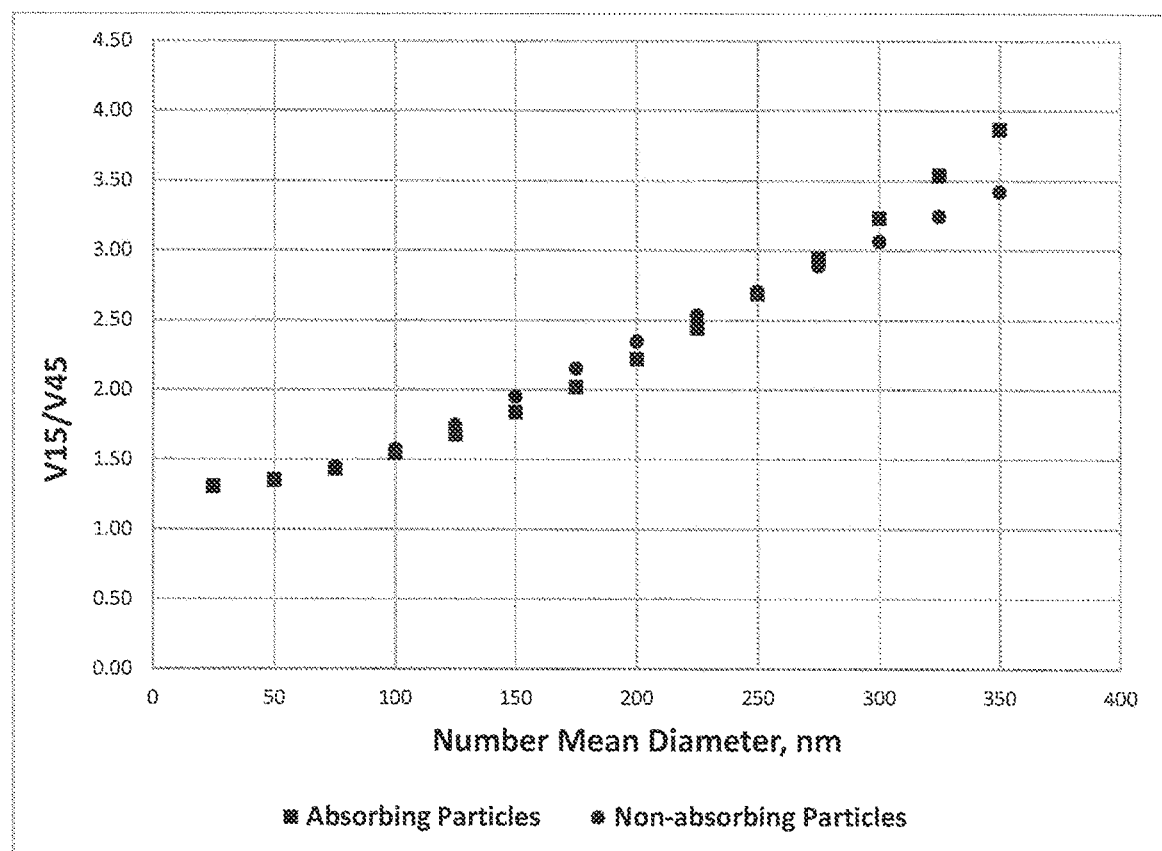
FIG. 14 is a chart illustrating the change in the voltage ratio at scattering angle 15° to 45° as a function of the number mean diameter $d_g$ of particle size distributions for (i) absorbing and (ii) non-absorbing particles, according to various embodiments of the present invention.

The use of average ratios is advantageous because the ultrafine particle detection becomes independent of the optical properties of the particles, such as index of refraction m and mass concentration. The ratio calculations $V_{15}/V_{45}$ for both absorbing and non-absorbing particles are shown in FIG. 14. FIG. 14 is a chart illustrating the change in the voltage ratio at scattering angle 15° to 45° as a function of the number mean diameter $d_g$ of particle size distributions for (i) absorbing and (ii) non-absorbing particles, according to various embodiments of the present invention. The x axis denotes the $V_{15}/V_{45}$ ratio and ranges from 0 to 4.5. The y axis denotes the number mean diameter and ranges from 0 to 400 nm. FIG. 14 shows that for the particle size range of primary interest (i.e. $d_p<350$ nm), there is little difference in the calculated ratio $V_{15}/V_{45}$. For the absorbing particles, the index of refraction used was m=1.613−0.795i, while for the non-absorbing particles, the index of refraction was m=1.613.

Despite the insignificant difference in calculated ratios corresponding to absorbing and non-absorbing particles, the ratios shown in FIG. 14 do not imply that the scattering intensities are the same for both absorbing and non-absorbing particles. Over the particle size range of 25 nm to 350 nm, the actual intensities can vary by factors of 2 to 3. For the absorbing particles, higher intensities for the smallest particle sizes are observed. In contrast, for the non-absorbing particles, the higher intensities are observed for the larger particles.

Figure 15:
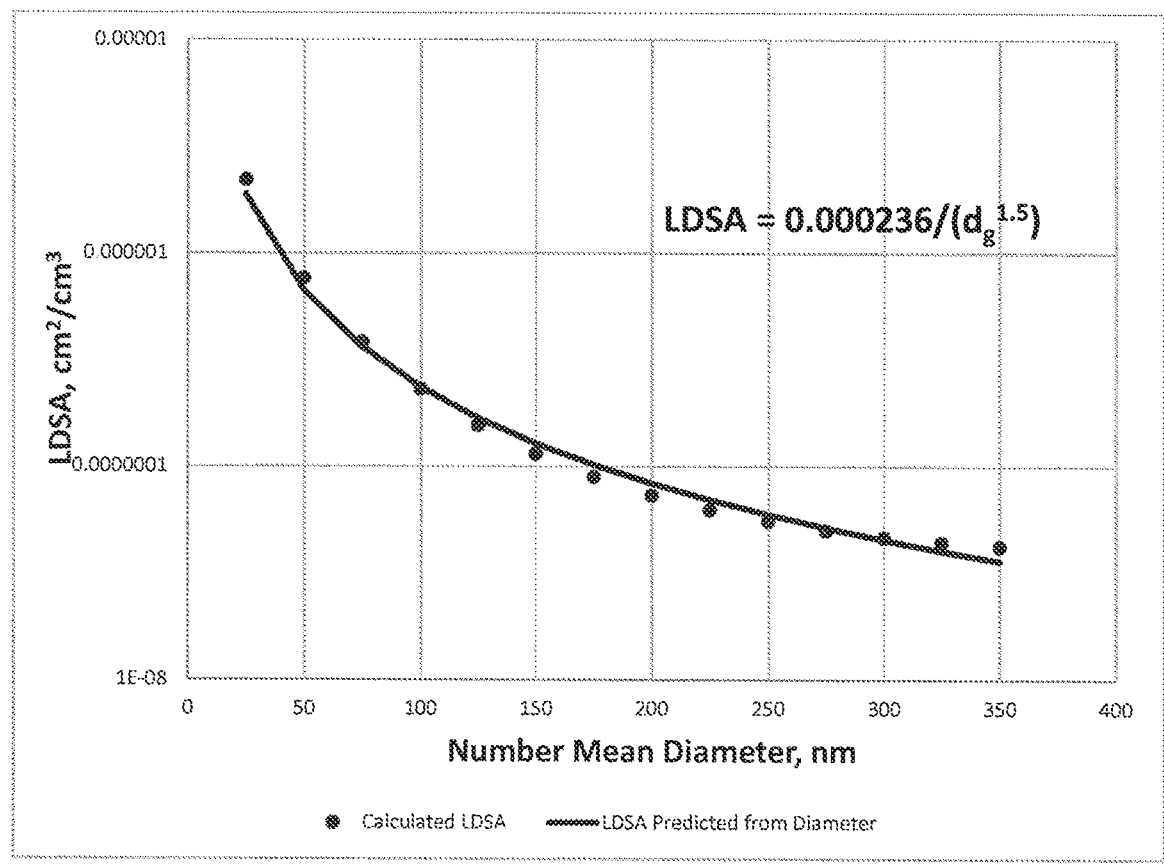
FIG. 15 is a chart illustrating the change in lung deposited surface area as a function of number mean diameter $d_g$ of particle size distributions as calculated based on the scattering intensity output signals and as predicted from the particle diameter, according to various embodiments of the present invention.

In various embodiments, after determining number mean diameters within the range of mean diameters below 350 nm, LDSA values may be analyzed to determine how LDSA values vary with particle diameter within this small particle size range. FIG. 15 is a chart illustrating the change in lung deposited surface area as a function of number mean diameter $d_g$ of particle size distributions as calculated based on the scattering intensity output signals and as predicted from the particle diameter, according to various embodiments of the present invention. In FIG. 15, LDSA values are plotted against number mean diameter values below 350 nm. The x-axis denotes the number mean diameter and ranges from 0 to 400 nm. The y-axis denotes LDSA values and ranges from 0.00000001 to 0.000001 cm²/cm³. The equation for LDSA includes a constant value 0.000236. The constant can be determined based on a mass concentration of 5 μg/m³. The constant may scale linearly with the total mass concentration. As previously described, for this particle size range, the intensity ratio, $V_{15}/V_{45}$, changes very little with the refractive index m of the particles, implying that this approach becomes independent of optical properties. This is advantageous because below the threshold ratio corresponding approximately to a particle diameter of 350 nm, surface area concentration may be determined based on comparing the ratio with the threshold value to determine whether the ratio is smaller or greater, independent of the optical properties of the particles. If the ratio is higher, then the LDSA is equivalent to a constant multiplied by the measured mass concentration. If the ratio is lower, then the mass concentration and intensity/voltage ratios may be used to determine number mean particle diameter and the corresponding surface area concentration, as described previously.

FIG. 2 is a system diagram illustrating the electronics components of an optical particle detection device according to various embodiments of the present invention. The three photodetectors 104A-C are positioned at desired scattering angles. AC coupling capacitors 202 are used for filtering out DC signals for each photodetector 104A-C output, such as DC signals used to power the device 100. In other words, the AC coupling capacitors 202 allow only high frequency AC signals to pass to the amplifiers 204, based on capacitor reactance. The amplifiers 204 amplify the output voltage signal that is emitted from it corresponding photodetector 104 in response to absorbing light from the light source 102, as scattered by the incoming airflow through the opening 116 of the device 100. The range of high and low particle mass concentrations M present in a particular particle sample may pose a challenge with respect to photodetector amplification. Thus, the device 100 may also include components for dynamic gain control, such as digital potentiometers 206. Using addressable digital potentiometers 206, the device 100 is able to dynamically change the amplifier gain for each photodetector 104a, 104b, 104c to prevent saturation. This dynamic adjustment enables the device 100 to detect both very large and very small mass concentrations of fine and ultrafine particles. Gain control may be adjusted dynamically with the digital potentiometers 206 to compensate for large changes in input range (e.g. varying mass concentration).

In some embodiments, multiplexed capacitors may also be included to enable on-demand AC coupling for each amplifier 204, which further allows the optical particle detection device 100 to extract air quality information from noisy environments or environments with significant light interference. Therefore, the digital potentiometers 206 in combination with the amplifier 204 may be operable to filter out noise from the voltage signals output by the photodetectors 104. In various embodiments, the embedded microcontroller 208 (e.g., local processor) may be configured to execute machine readable instructions to control the digital potentiometer 206 to implement this dynamic gain control function. The optical particle detection device 100 may be powered by a battery and power regulation circuit 210. The embedded microcontroller 208 may be operably coupled to a persistent data storage 212, such as a suitable non-volatile memory device, such as ROM. The device 100 may also include non-persistent data storage (not shown) such as non-volatile RAM or another suitable non-volatile memory device.

In one embodiment, the device 100 comprises a low energy wireless transceiver 214 (e.g., wireless communication circuit) for wireless communications by the device 100. For example, as described previously, the wireless transceiver 214 may be a BLE transceiver for enabling BLE RF wireless communications. As such, data stored in the storage device 212 may be wirelessly transmitted from the device 100. As described previously, the device 100 may also include a 3-color LED 216 that can represent recent air quality and status of device using color and changes in color and intensity (pulsation). Tri-color LEDs 216 may provide immediate, expressive feedback regarding the current air quality, trending behavior, and device status. This information can be communicated through the composite color of the LEDs as well as through the LEDs behavior such as blinking, pulsing, or color cycling. As described previously, the sensor device could also include another sensor such as a VOC chip (not shown) that may be mounted to the printed circuit board 114. The VOC chip may measure VOC pollution; for example the VOC chip may generate VOC pollution measurements based on gases emitted from organic chemicals in products such as paints, air fresheners and cleansers. Additionally or alternatively, the device 100 may further include low-power, MEMS temperature, pressure, and humidity sensors. These additional sensors, which could be mounted to the printed circuit board 114, can provide additional dimensions of environmental and air quality information that can be used to augment device feedback and user guidance, both on the device and through software services.

Figure 3:
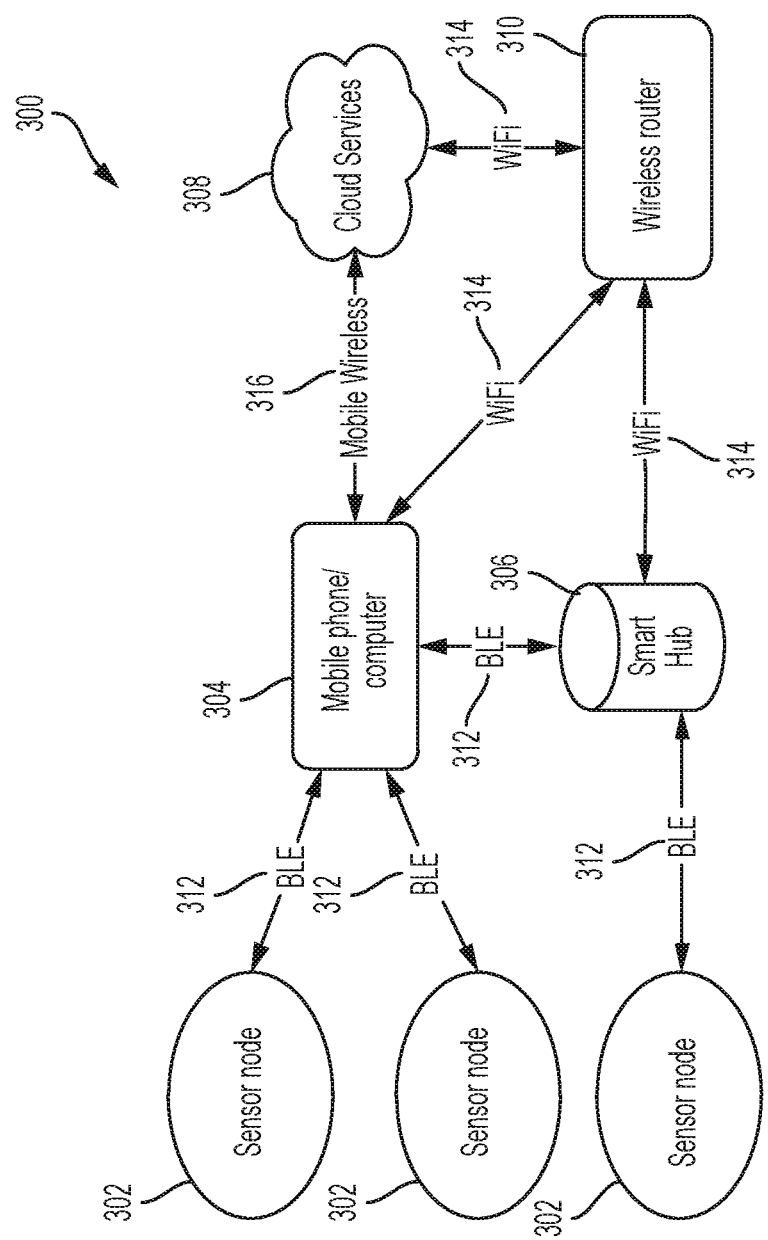
FIG. 3 is a block diagram of an embodiment of the present invention illustrating wireless network connections between an optical particle detection device, a mobile phone device, on-line cloud data storage facilities, a wireless router, and a plurality of sensor nodes.

FIG. 3 is a block diagram of a of an embodiment of the present invention illustrating wireless network connections between an optical particle detection device, a mobile phone device, on-line cloud data storage facilities, a wireless router, and a plurality of sensor nodes. A network 300 includes a number of sensor devices 100. In the illustrated embodiment, two of the sensor devices 100 are in wireless communication (e.g., BLE) with a mobile phone or computer 304 (e.g., remote processor) and another sensor device is in wireless communication (BLE) with a smart hub 306. The smart hub 306 could also be in wireless communication with the mobile phone/computer 304. In addition, both the smart hub 306 and the mobile phone/computer 304 could be connected to cloud services 308 via a wireless router 310.

In contrast to existing particle detection devices, optical particle detection devices 100 according to embodiments of the present invention can be capable of consistent communication interfacing with mobile devices 304 and residential devices 306. In addition, to reduce power consumption, the devices 100 may (i) use a small battery 210 that operates for extended timespans; (ii) use a low-energy wireless protocol (e.g. BLE); (iii) be unconnected if data is not being transferred; and (iv) only transmit dynamic information (i.e. the data should reflect a change in measurement) when connected to reduce the amount of transmitted data. A Kalman filter may be used to build a model of expected sensor behavior that is synchronized between the device 100 and cloud 308. This model may enable the device 100 to reduce the transmission of redundant behavior by primarily transmitting measurements that significantly differ from or alter the model (i.e., dynamic information). As part of the model synchronization step, the clock of the device 100 can be synchronized with the cloud server time.

In one embodiment, a mobile phone 304 operates as the router 310 to cloud-based server storage such as the cloud services 308 via, for example, a mobile wireless link 316. In other embodiments, a separate wireless router 310 is provided. BLE communication is an exemplary communication protocol for the device 100. In other embodiments, different wireless communication channels and links can be used. In addition, in some embodiments, the optical particle detection device 100 comprises circuits for minimizing or reducing power consumption from the wireless communications operations of the device 100. The circuits may include cache and timing circuitry to enable such wireless connections to enable periodic synchronization. In other words, synchronization may be performed when possible (according to the model of expected sensor behavior), rather than performed continuously. Additionally, time adjustment can also be performed through BLE communication, such as, for example, to keep the device clock in synchronization with the external devices.

Figure 4:
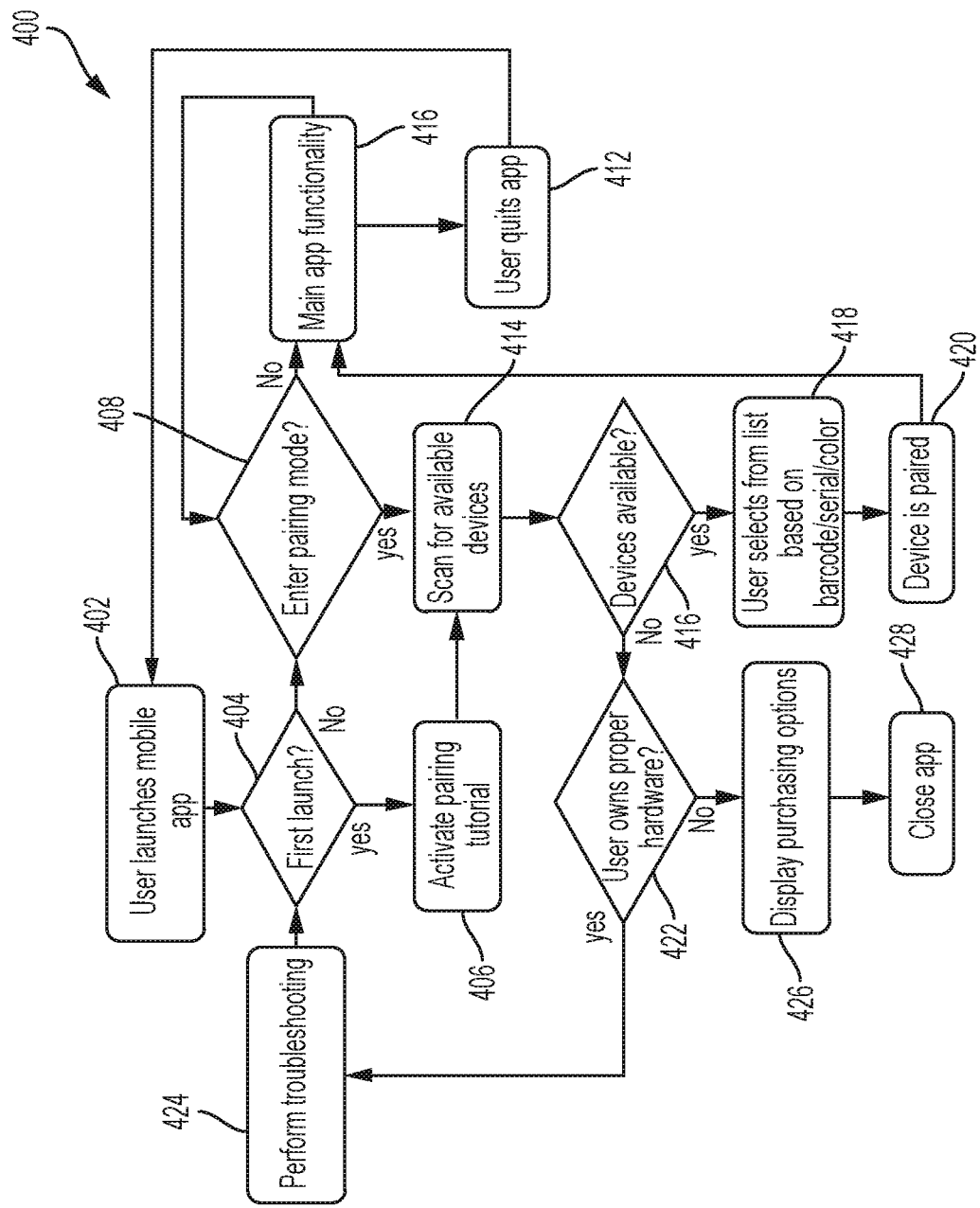
FIG. 4 is a block diagram of a process according to various embodiments of the present invention by which an optical particle detection device is being paired for incorporation into a local air quality sensor network.

FIG. 4 is a block diagram of a process according to various embodiments of the present invention by which an optical particle detection device is being paired for incorporation into a local air quality sensor network. As illustrated by FIG. 4, a method 400 for pairing an optical particle detection device 100 with a mobile device (e.g., smartphone, tablet, laptop, smart watch, etc.) 304 or a local air quality sensor network is shown. In various embodiments, a user of the device 100 launches a mobile app on their mobile device 304 to be paired with the optical particle detection device 100. Upon loading the mobile app, a microprocessor (e.g., remote processor) of the mobile device 304 checks whether the mobile app was launched for the first time. If the microprocessor determines that this is the first launch, the mobile device 304 activates a pairing tutorial. The pairing tutorial may comprise using a scanner of the mobile device 304 to scan for available devices, such as via WiFi or Bluetooth. If the microprocessor determines that this is not the first launch, the mobile device 304 prompts the user to determine whether the device 304 should enter pairing mode. If the user indicates no (via a touch screen interface, for example), the mobile device transitions to a main app functionality screen. From the functionality screen, the user may quit (i.e. exit) the app. If the user indicates yes, the scanner scans for available devices 100. The mobile device 304 checks whether there exist available devices 100.

If available devices are found, the user selects from a list of available optical particle detection device 100 based on characteristics of the available devices, such as barcode, serial number and color. Upon the user making a selection, the mobile device 304 pairs with the available device 100 as long as the pairing is authorized. The user may press a "pair button" of the mobile device 304 to commence the pairing process. As previously stated, the user may select an available optical particle detection device 100 using identifying information such as a printed serial number. In one embodiment, one long press of the power button of the mobile device 304 indicates that a subsequent pairing attempt is authorized. In one embodiment, the pairing process may comprise prompting the user to answer questions pertaining to the device 100 to be paired, such as contextual information of the device. Such questions may include but are not limited to: the specific location of the device 100, whether the device 100 will be used as in a static or mobile manner, the context of use (e.g. kitchen versus bedroom), and whether the data should be made public, private, or limited to the specific home or building in which it is deployed. Upon pairing, the mobile device 304 may transition to the main app functionality screen.

If available devices are not found, the mobile device 304 checks whether the user owns appropriate hardware for pairing. If the user does own appropriate hardware for pairing, the mobile device 304 performs a troubleshooting process. After completing troubleshooting, the microprocessor checks whether the mobile app was launched for the first time since the troubleshooting process was completed. If the user does own appropriate hardware for pairing, the mobile device 304 displays purchasing options on a display screen of the mobile device 304. After the user is presented with purchasing options, the mobile device 304 may close the mobile app. If there exist available devices, the mobile device 304 checks whether the user owns proper or suitable hardware for pairing.

In various embodiments, power consumption of the optical particle detection device 100 primarily depends on the sampling rate and power state of the device 100. Additionally, power consumption depends on the frequency of wireless transmission and reception of data by the device 100. When the device is not actively acquiring a data sample, the light source 102 (e.g. a laser, vixel, or LED) may remain unpowered to minimize power draw. Sampling rate may be fixed or variable. In the variable case, the sampling rate can depend on the values being measured by the device 100. If the air quality is stable and is not elevated, the device 100 may keep the light source 102 in an unpowered state and waking periodically to detect changes. Such periodic sampling can reduce current draw by the device 100. If the air quality is elevated or rapidly changing, the light source 102 may be powered on such that air quality measurements are made more frequently by the optical particle detection device 100. Other exogenous factors affecting sampling rate may be provided by a mobile device. Exogenous factors may include the presence of people in the vicinity of the device 100 (e.g. via a mobile app on the mobile device or via a machine learning thermostat), the respective schedule of the people, the time of the day, day of the week, and the air quality data itself.

If the mobile device is within range of the device 100, such detection may indicate that the location is occupied by a user of the mobile device. Accordingly, the sampling rate of the optical particle detection device 100 may be increased. In contrast, if the device 100 has not been in contact with a paired (i.e. connected with the device 100) mobile device for a period of time, the sampling rate of the device 100 may be decreased since brief air quality events may be less important for the user. In one embodiment, the user is given override control over the sampling rate, such as via an input on the paired mobile device. Data samples may be first written to the onboard storage 212 of the device 100 for subsequent upload via low energy wireless transceiver 214. In one embodiment, in order to minimize the amount of data that must be uploaded, only data points that deviate by a specified percentage from the last uploaded point or are older than a specified minimum sample rate will be queued for upload. Uploading may occur in the most energy efficient manner for the wireless protocol used (e.g. Bluetooth Low Energy).

The optical particle detection device 100 may be intended to operate independently or as one of many such devices distributed throughout a home or other location. The devices 100 can provide visible and immediate feedback such that, for example, detailed information is provided on the mobile device of a user via push notifications. Push notifications may be notifications regarding, for example, air quality warnings, error states requiring service, and low battery. Considering the small size of the device 100, providing coherent information to users via the monitors of their respective mobile devices may be desirable. To minimize cost, a tri-color LED 216 may be used on the device to convey information coded in color and pattern (e.g. flashing, pulsing, solid colors). In one embodiment, the user's mobile device and/or cloud services may synthesize information from multiple devices 100 along with user-provided contextual information such as device location and user activity to provide the most relevant feedback in a clear, intuitive manner. The device may use the LED 216 to indicate that the user should check the mobile device for push notifications. The LED 216 may notify the user via a unique color or pulse to inform the user to check their mobile device.

As previously described, in some embodiments, the optical particle detection device 100 may include a VOC chip. The current accuracy and fouling-level of the VOC chip can be estimated using an algorithm dependent on the historical values of the particulate sensor; the VOC sensor's values; other VOC sensor values in the case of multiple devices near one-another but with different deployment-dates; and based on time since installation generally. In order to maintain accurate and usable VOC information, the user of the device 100 should be notified when the VOC chip or whole unit must be replaced for the results to remain valid.

In various embodiments, the small size and low cost of the device 100 allows the creation of active air quality signs. These signs clearly display the immediate air quality for that location. Where power is unavailable, the display may utilize a battery 210 and low-power display methods such as e-ink. Small solar panels may be used to charge the device 100. A companion app may connect to any active air quality sign in range and display its measurements while optionally uploading the measurements of the device 100 to the cloud for aggregation and visualization. Increased user participation in the upload process may decrease latency and create value through any user-contributed contextual information or discussion.

The low energy ultrafine optical particle detection device 100 may also be used as a sensor for other internet-connected appliances such as HVAC systems and air purifiers. Smart home hubs and other systems with the same low-energy wireless protocols may communicate with the device 100 and cloud-based services through an open API. Specific triggers and feedback systems may be specified by the user to perform actions such as turning on air purifiers, fans, or HVAC systems when air quality becomes poor. Connection to a smart home hub may also enable on-demand connection to the device 100 when the user is not present in the home. A dedicated hub for homes with multiple particle detectors can also be possible for homes that do not require a more full-featured hub.

Therefore, in one general aspect, the present invention is directed to an air particle detection device that comprises a housing defining a detection zone such that an air particle flow flows through the detection zone. The air particle detection device also comprises an electromagnetic radiation source (e.g., a laser) located in the housing, such that the electromagnetic radiation source emits electromagnetic radiation along an electromagnetic radiation path toward the detection zone, such that the air particle flow scatters the electromagnetic radiation from the electromagnetic radiation source. The air particle detection device further comprises first and second electromagnetic radiation sensors (e.g., photodetectors), such that each electromagnetic radiation sensor is positioned at a different scattering angle relative to the electromagnetic radiation path. That way, the first and second electromagnetic radiation sensors produce different scattering intensity output signals that are indicative of the intensity of the electromagnetic radiation scattered at the corresponding scattering angle of the respective electromagnetic radiation sensor by the air particle flow. The air particle detection device further comprises a processor communicatively coupled to the first and second electromagnetic radiation sensors. The processor receives the scattering intensity output signals from the first and second electromagnetic radiation sensors, and is configured to calculate a mass fraction of ultrafine air particles in the air particle flow based in part on a ratio of the scattering intensity output signals from the first and second electromagnetic radiation sensor.

In various implementations, the processor is configured to calculate the mass fraction of ultrafine air particles in the air particle flow based on a mass concentration parameter for the air particle flow. In some situations, the air particle detection device further comprises a first lens located between the detection zone and the first electromagnetic radiation sensor and/or a second lens located between the detection zone and the second electromagnetic radiation sensor. Also, the housing of the air particle detection device could further comprise an environmental sensor to output an environmental sensor signal indicative of an environmental parameter to the processor and in such a circumstance, the processor can calculate the mass fraction of ultrafine air particles additionally based on the environmental parameter. Such an environmental sensor could be, for example, a temperature sensor, a humidity sensor, a pressure sensor, and/or a volatile organic compound (VOC) sensor. The processor could comprise two or more processors, for example, such as a first processor in the housing and a second processor being remote from the first processor and in wireless communication with the first processor. In such an implementation, the second, remote processor can apply Kalman filtering to the outputs of the first and second electromagnetic sensors (and the environmental sensor if present) to improve the calculation of the mass fraction of ultrafine air particles in the air particle flow. The second, remote processor may also be further configured to use machine learning to compensate for effects of the environmental parameter in the calculation of the mass fraction of ultrafine air particles in the air particle flow.

In various implementations, the calculated mass fraction of ultrafine particles may be the ratio of the mass of ultrafine particles to the mass of all $PM_{2.5}$ particles in the air particle flow. The housing may also further comprise a micro-fan to control the flow of the air particle flow through the detection zone. The housing can also comprise display for displaying an indication of a quality of the air particle flow based on the calculated mass fraction of ultrafine air particles. Moreover, the housing may comprise one or more circuit boards and the processor could be mounted to the one or more circuit boards. The housing could also comprise a wireless communication circuit, in which case the processor can be part of a remote computer device that is remote from the housing. In such a circumstance, the remote processor is in wireless communication with the wireless communication circuit of the housing. Generally, the electromagnetic radiation source may comprise a laser; and the first and second electromagnetic radiation sensors may comprise photosensors. In this connection, the air particle detection device may comprise a lens located between the laser and the detection zone.

In yet another general aspect, the present invention is directed to a method of detecting a mass fraction of ultrafine air particles in an air particle flow. The method comprises the step of directing electromagnetic radiation from an electromagnetic radiation source, located in a housing, along a electromagnetic radiation path toward a detection zone defined by the housing such that an air particle flow flowing through the detection zone scatters the electromagnetic radiation from the electromagnetic radiation source. The method also comprises the steps of (i) producing, by a first electromagnetic radiation sensor, a first output signal that is indicative of an intensity of electromagnetic radiation from the electromagnetic radiation source scattered at a first scattering angle relative to the electromagnetic radiation path; and (ii) producing, by a second electromagnetic radiation sensor, a second output signal that is indicative of an intensity of electromagnetic radiation from the electromagnetic radiation source scattered at a second scattering angle relative to the electromagnetic radiation path, where the first scattering angle is different from the second scattering angle. Moreover, the method further comprises the step of calculating, by the processor, a mass fraction of ultrafine air particles in the air particle flow based on at least a ratio of the first and second scattering intensity output signals.

In various implementations, the calculating the mass fraction of ultrafine air particles in the air particle flow step of the method further comprises making the calculation based on a mass concentration parameter for the air particle flow. The method could also comprise the step of generating, by the processor, a warning based on a comparison of the mass fraction of ultrafine air particles to a first predetermined threshold. The method further may comprise the step of dynamically adjusting, by a digital potentiometer, an amplifier gain of the first and second electromagnetic radiation sensors.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. An air particle detection device comprising:
   a housing defining a detection zone, such that an air particle flow flows through the detection zone;
   an electromagnetic radiation source located in the housing, wherein the electromagnetic radiation source emits electromagnetic radiation along an electromagnetic radiation path toward the detection zone, such that the air particle flow scatters electromagnetic radiation from the electromagnetic radiation source;

first and second electromagnetic radiation sensors, wherein each of the first and second electromagnetic radiation sensors is positioned at a different scattering angle relative to the electromagnetic radiation path, such that each of the first and second electromagnetic radiation sensors produces a scattering intensity output signal indicative of an intensity of the electromagnetic radiation scattered at the corresponding scattering angle of the corresponding electromagnetic radiation sensor by the air particle flow; and a processor communicatively coupled to the first and second electromagnetic radiation sensor, wherein the processor is configured to:
receive the scattering intensity output signals from the first and second electromagnetic radiation sensors; and
calculate a mass fraction of ultrafine air particles in the air particle flow based in part on a ratio of the scattering intensity output signals from the first and second electromagnetic radiation sensor.

2. The air particle detection device of claim 1, wherein the processor is further configured to calculate the mass fraction of ultrafine air particles in the air particle flow based on a mass concentration parameter for the air particle flow.

3. The air particle detection device of claim 1, further comprising a lens located between the detection zone and the first electromagnetic radiation sensor.

4. The air particle detection device of claim 1, wherein:
the housing further comprises an environmental sensor to output an environmental sensor signal indicative of an environmental parameter to the processor; and
the processor calculates the mass fraction of ultrafine air particles in the air particle flow additionally based on the environmental parameter.

5. The air particle sensor of claim 4, wherein the processor comprises at least two processors, including a first processor in the housing and a second processor being remote from the first processor and in wireless communication with the first processor.

6. The air particle sensor of claim 5, wherein the second processor applies Kalman filtering to the outputs of the first and second electromagnetic sensors and the environmental sensor to improve the calculation of the mass fraction of ultrafine air particles in the air particle flow.

7. The air particle sensor of claim 6, wherein the second processor is further configured to use machine learning to compensate for effects of the environmental parameter in the calculation of the mass fraction of ultrafine air particles in the air particle flow.

8. The air particle detection device of claim 7, wherein the environmental sensor is selected from the group consisting of a temperature sensor, a humidity sensor, a pressure sensor, and a volatile organic compound (VOC) sensor.

9. The air particle detection device of claim 1, wherein the processor calculates the mass fraction of the ultrafine particles to $PM_{2.5}$ particles.

10. The air particle detection device of claim 1, wherein the housing further comprises a micro-fan to control the flow of the air particle flow through the detection zone.

11. The air particle detection device of claim 1, wherein the housing further comprises a display for displaying an indication of a quality of the air particle flow based on the calculated mass fraction of ultrafine air particles.

12. The air particle detection device of claim 1, wherein:
the housing comprises one or more circuit boards; and
the processor is mounted to the one or more circuit boards.

13. The air particle detection device of claim 1, wherein:
the housing comprises a wireless communication circuit; and
the processor is part of a remote computer device that is remote from the housing and wherein the processor is in wireless communication with the wireless communication circuit of the housing.

14. The air particle detection device of claim 1, wherein the first and second electromagnetic radiation sensors are removable and replaceable in the housing.

15. A method of detecting a mass fraction of ultrafine air particles in an air particle flow, the method comprising:
directing electromagnetic radiation from an electromagnetic radiation source along a electromagnetic radiation path toward a detection zone defined by a housing such that an air particle flow flowing through the detection zone scatters the electromagnetic radiation from the electromagnetic radiation source, wherein the electromagnetic radiation source is located in the housing;
producing, by a first electromagnetic radiation sensor, a first output signal that is indicative of an intensity of electromagnetic radiation from the electromagnetic radiation source scattered at a first scattering angle relative to the electromagnetic radiation path;
producing, by a second electromagnetic radiation sensor, a second output signal that is indicative of an intensity of electromagnetic radiation from the electromagnetic radiation source scattered at a second scattering angle relative to the electromagnetic radiation path, wherein the first scattering angle is different from the second scattering angle;
calculating, by the processor that is in communication with the first and second electromagnetic radiation sensors, a mass fraction of ultrafine air particles in the air particle flow based on at least a ratio of the first and second output signals.

16. The method of claim 15, wherein calculating the mass fraction of ultrafine air particles in the air particle flow further comprises making the calculation based on a mass concentration parameter for the air particle flow.

17. The method of claim 15, further comprising generating, by the processor, a warning based on a comparison of the mass fraction of ultrafine air particles to a first predetermined threshold.

18. The method of claim 15, further comprising dynamically adjusting, by a digital potentiometer, an amplifier gain of the first and second electromagnetic radiation sensors.

19. The air particle detection device of claim 1, wherein:
the electromagnetic radiation source comprises a laser; and
first and second electromagnetic radiation sensors comprise photosensors.

20. The air particle detection device of claim 19, further comprising a lens located between the laser and the detection zone.

* * * * *